United States Patent
Ghanbarinejad et al.

(10) Patent No.: US 12,557,052 B2
(45) Date of Patent: Feb. 17, 2026

(54) TIMING AND FREQUENCY ADJUSTMENTS IN NON-TERRESTRIAL NETWORKS

(71) Applicant: Lenovo (Singapore) Pte. Ltd., New Tech Park (SG)

(72) Inventors: Majid Ghanbarinejad, Chicago, IL (US); Vijay Nangia, Woodridge, IL (US); Hyejung Jung, Northbrook, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 370 days.

(21) Appl. No.: 18/245,530

(22) PCT Filed: Sep. 15, 2021

(86) PCT No.: PCT/IB2021/058432
§ 371 (c)(1),
(2) Date: Mar. 15, 2023

(87) PCT Pub. No.: WO2022/058913
PCT Pub. Date: Mar. 24, 2022

(65) Prior Publication Data
US 2023/0362857 A1 Nov. 9, 2023

Related U.S. Application Data

(60) Provisional application No. 63/078,797, filed on Sep. 15, 2020.

(51) Int. Cl.
*H04W 56/00* (2009.01)
(52) U.S. Cl.
CPC .............................. *H04W 56/0045* (2013.01)
(58) Field of Classification Search
None
See application file for complete search history.

(56) References Cited

U.S. PATENT DOCUMENTS 11,968,640 B2 * 4/2024 Xu ..................... H04W 56/0035
12,177,904 B2 * 12/2024 You ..................... H04W 56/0045
(Continued)

FOREIGN PATENT DOCUMENTS

WO    WO-2021032453 A1 *  2/2021  ......... H04B 7/18504

OTHER PUBLICATIONS

PCT/IB2021/058432, "Notification of Transmittal of the International Search Report and the Written Opinion of the International Searching Authority, or the Declaration", International Searching Authority, Dec. 23, 2021, pp. 1-12.

(Continued)

*Primary Examiner* — Kodzovi Acolatse
(74) *Attorney, Agent, or Firm* — Kunzler Needham & Hilton

(57) ABSTRACT

Apparatuses, methods, and systems are disclosed for timing and frequency adjustments in non-terrestrial networks. One apparatus includes a processor that determines a first frequency from one of a first reference signal received from a mobile wireless communication network and a configuration message received from the mobile wireless communication network. The processor determines a second frequency from a second reference signal received from the mobile wireless communication network. The processor computes a second timing advance value based on a first timing advance value, the first determined frequency, and the second determined frequency, the first timing advance value received as part of a control message. The apparatus includes a transceiver that transmits, to the mobile wireless communication network, an uplink signal using the second timing advance value.

19 Claims, 21 Drawing Sheets

(56) References Cited

U.S. PATENT DOCUMENTS

| | | |
|---|---|---|
| 2018/0241464 A1 | 8/2018 | Michaels |
| 2022/0086780 A1* | 3/2022 | Tsai .................... G01S 19/05 |
| 2023/0145930 A1* | 5/2023 | Park .................... H04L 1/1812 |
| | | 370/329 |
| 2023/0300768 A1* | 9/2023 | Atungsiri .......... H04W 56/0045 |
| | | 370/503 |

OTHER PUBLICATIONS

Moderator (Thales), "Feature lead Summary on enhancements on UL time and frequency synchronization for NR NTN", 3GPP TSG-RAN WG1 Meeting #102-e R1-2007290, Aug. 17-28, 2020, pp. 1-60.

Thales, "Solutions for NR to support non-terrestrial networks (NTN)", 3GPP TSG RAN meeting #86 RP-193234, Dec. 9-13, 2019, pp. 1-10.

3GPP, "3rd Generation Partnership Project; Technical Specification Group Radio Access Network; Solutions for NR to support non-terrestrial networks (NTN) (Release 16)", 3GPP TR 38.821 V16.0.0, Dec. 2019, pp. 1-140.

3GPP, "3rd Generation Partnership Project; Technical Specification Group Radio Access Network; NR; Requirements for support of radio resource management (Release 16)", 3GPP TS 38.133 V16.4.0, Jun. 2020, pp. 1-1463.

3GPP, "3rd Generation Partnership Project; Technical Specification Group Radio Access Network; NR; Physical channels and modulation (Release 16)", 3GPP TS 38.211 V16.2.0, Jun. 2020, pp. 1-131.

3GPP, "3rd Generation Partnership Project; Technical Specification Group Radio Access Network; NR; Physical layer procedures for control (Release 16)", 3GPP TS 38.213 V16.2.0, Jun. 2020, pp. 1-176.

3GPP, "3rd Generation Partnership Project; Technical Specification Group Radio Access Network; NR; Medium Access Control (MAC) protocol specification (Release 16)", 3GPP TS 38.321 V16.1.0, Jul. 2020, pp. 1-151.

3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.

* cited by examiner

Table 200: UE Timing Advance adjustment accuracy

| UL Sub Carrier Spacing(kHz) | 15 | 30 | 60 | 120 |
|---|---|---|---|---|
| UE Timing Advance adjustment accuracy | ±256 $T_c$ | ±256 $T_c$ | ±128 $T_c$ | ±32 $T_c$ |

FIG. 2

Table 300: $T_e$ Timing Error Limit

| Frequency Range | SCS of SSB signals (kHz) | SCS of uplink signals (kHz) | $T_e$ |
|---|---|---|---|
| 1 | 15 | 15 | 12*64*$T_c$ |
| | | 30 | 10*64*$T_c$ |
| | | 60 | 10*64*$T_c$ |
| | 30 | 15 | 8*64*$T_c$ |
| | | 30 | 8*64*$T_c$ |
| | | 60 | 7*64*$T_c$ |
| 2 | 120 | 60 | 3.5*64*$T_c$ |
| | | 120 | 3.5*64*$T_c$ |
| | 240 | 60 | 3*64*$T_c$ |
| | | 120 | 3*64*$T_c$ |
| Note 1: $T_c$ is the basic timing unit defined in TS 38.211 [6] | | | |

FIG. 3

Table 400: The Value of $N_{TA\;offset}$

| Frequency range and band of cell used for uplink transmission | $N_{TA\;offset}$ (Unit: $T_c$) |
|---|---|
| FR1 FDD band without LTE-NR coexistence case or FR1 TDD band without LTE-NR coexistence case | 25600 (Note 1) |
| FR1 FDD band with LTE-NR coexistence case | 0 (Note 1) |
| FR1 TDD band with LTE-NR coexistence case | 39936 (Note 1) |
| FR2 | 13792 |
| Note 1: | The UE identifies $N_{TA\;offset}$ based on the information n-TimingAdvanceOffset as specified in TS 38.331 [2]. If UE is not provided with the information n-TimingAdvanceOffset, the default value of $N_{TA\;offset}$ is set as 25600 for FR1 band. In case of multiple UL carriers in the same TAG, UE expects that the same value of n-TimingAdvanceOffset is provided for all the UL carriers according to clause 4.2 in TS 38.213 [3] and the value 39936 of $N_{TA\;offset}$ can also be provided for a FDD serving cell. |
| Note 2: | Void |

FIG. 4

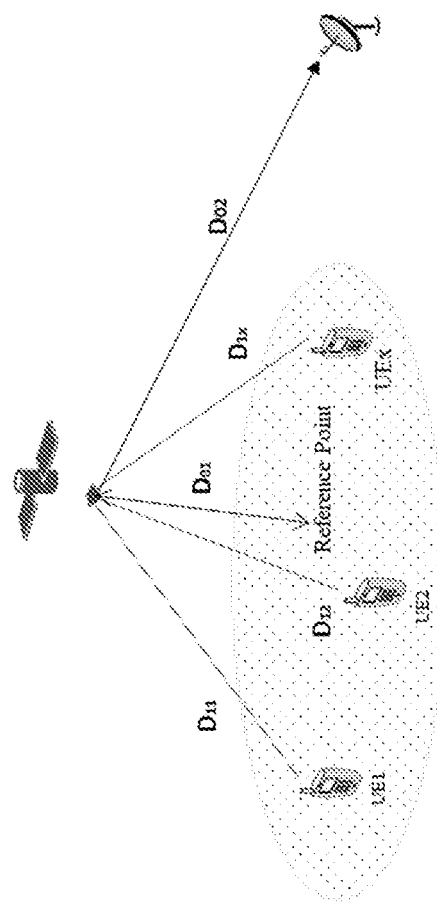
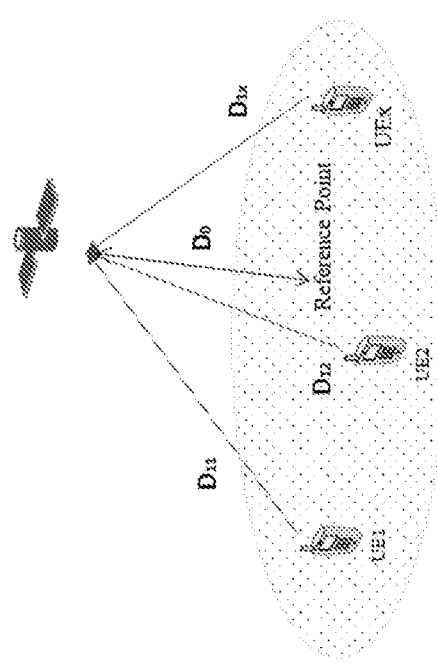
FIG. 5

TIMING AND FREQUENCY ADJUSTMENTS IN NON-TERRESTRIAL NETWORKS

CROSS-REFERENCE TO RELATED APPLICATIONS

This application claims the benefit of U.S. Provisional Patent Application No. 63/078,797, entitled "TIMING AND FREQUENCY ADJUSTMENTS IN NON-TERRESTRIAL NETWORKS" and filed on Sep. 15, 2020, for Majid Ghanbarinejad et al., which is incorporated herein by reference.

FIELD

The subject matter disclosed herein relates generally to wireless communications and more particularly relates to timing and frequency adjustments in non-terrestrial networks.

BACKGROUND

Non-terrestrial networks include components that involve non-terrestrial flying objects. As such, signal timing and frequency adjustments may be needed for efficient and effective communications.

BRIEF SUMMARY

Disclosed are procedures for timing and frequency adjustments in non-terrestrial networks. The procedures may be implemented by apparatus, systems, methods, or computer program products.

In one embodiment, an apparatus includes a processor that determines a first frequency from one of a first reference signal received from a mobile wireless communication network and a configuration message received from the mobile wireless communication network.

In one embodiment, the processor determines a second frequency from a second reference signal received from the mobile wireless communication network. In one embodiment, the processor computes a second timing advance value based on a first timing advance value, the first determined frequency, and the second determined frequency, the first timing advance value received as part of a control message. In one embodiment, the apparatus includes a transceiver that transmits, to the mobile wireless communication network, an uplink signal using the second timing advance value.

In one embodiment, another apparatus includes a transceiver that transmits, to a User Equipment ("UE") device, one of a first reference signal and a configuration message, transmits, to the UE device, a second reference signal, transmits, to the UE device, a control message comprising a first timing advance value, and receives, from the UE device, an uplink signal that is transmitted using a second timing advance value, the second timing advance value determined based on a first frequency determined from one of the first reference signal and the configuration message, a second frequency determined from the second reference signal, and the first timing advance value.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2 depicts a diagram illustrating a table of UE Timing Advance adjustment accuracy;

FIG. 3 depicts a diagram illustrating a table of Timing Error Limit, according to one or more embodiments of the present disclosure;

FIG. 4 depicts a diagram illustrating a table for the value of $N_{TA\ offset}$, according to one or more embodiments of the present disclosure;

FIG. 5 depicts a diagram illustrating TA components in NTN (For simplicity, TA offset $N_{TA\ offset}$ is not plotted.), according to one or more embodiments of the present disclosure;

DETAILED DESCRIPTION

Figure 1A:
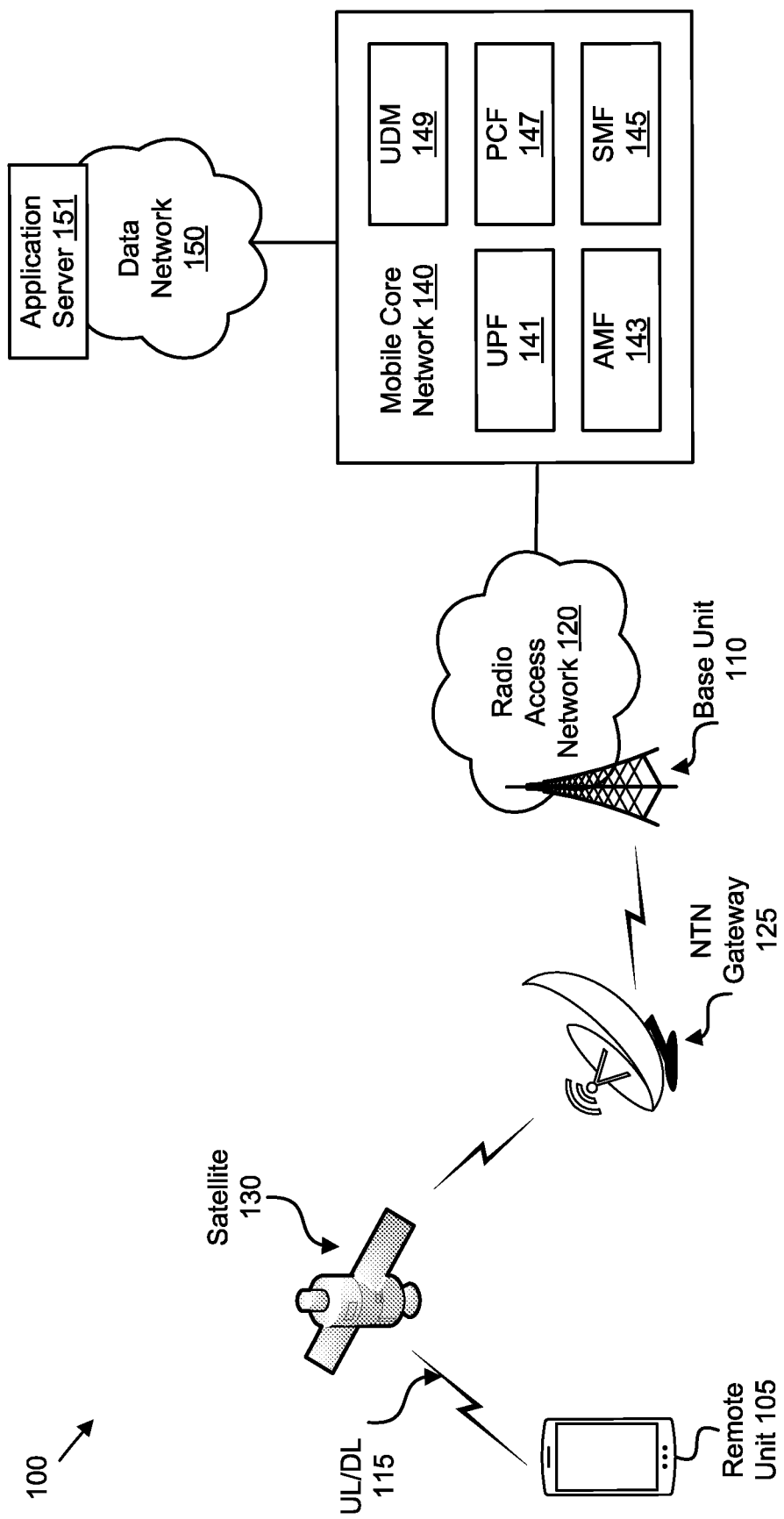
FIG. 1A is a schematic block diagram illustrating one embodiment of a wireless communication system for timing and frequency adjustments in non-terrestrial networks, according to one or more embodiments of the present disclosure.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for timing and frequency adjustments in non-terrestrial networks. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

This disclosure proposes a unified framework for adjustment of timing advance in non-terrestrial networks. The proposed methods cover different scenario including systems with regenerative and transparent payloads with or without equipment and signaling of location and velocity. Particularly, methods of adjusting and updating timing advance based on Doppler measurements on a reference signals were proposed and elaborated.

In one embodiment, the subject matter disclosed herein describes solutions for timing advance ("TA") and frequency adjustments in non-terrestrial networks ("NTNs"). The airborne or spaceborne communication entity that provides a service link to a UE is referred to as a non-terrestrial transmit-receive point ("NT-TRP"). It should be noted that the functionalities and the protocol stack implemented in the NT-TRP may be different in different scenarios, for example in the case of systems based on a transparent payload versus a regenerative payload. Communications from the UE to the NT-TRP may be referred to as uplink and communications from the NT-TRP to the UE are referred to as downlink.

FIG. 1A depicts a wireless communication system 100 supporting random access procedure in non-terrestrial network, according to embodiments of the disclosure. In one embodiment, the wireless communication system 100 includes at least one remote unit 105, a radio access network ("RAN") 120 (e.g., a NG-RAN), and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, satellites 130, non-terrestrial network gateways 125 (e.g., satellite ground/earth devices), and mobile core networks 140 are depicted in FIG. 1, one of skill in the art will recognize that any number of remote units 105, base units 110, wireless communication links 115, RANs 120, satellites 130, non-terrestrial network gateways 125 (e.g., satellite ground/earth devices), and mobile core networks 140 may be included in the wireless communication system 100.

In one implementation, the RAN 120 is compliant with the 5G system specified in the 3GPP specifications. In another implementation, the RAN 120 is compliant with the LTE system specified in the 3GPP specifications. More generally, however, the wireless communication system 100 may implement some other open or proprietary communication network, for example WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with the base units 110 in the RAN 120 via uplink ("UL") and downlink ("DL") communication signals. In some embodiments, the remote units 105 communicate in a non-terrestrial network via UL and DL communication signals between the remote unit 105 and a satellite 130. The satellite 130 may communicate with the RAN 120 via an NTN gateway 125 using UL and DL communication signals between the satellite 130 and the NTN gateway 125. The NTN gateway 125 may communicate directly with the base units 110 in the RAN 120 via UL and DL communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 151 in the packet data network 150 using the PDU session. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, a RAN node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110. Note that during NR-U operation, the base unit 110 and the remote unit 105 communicate over unlicensed radio spectrum.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 141. The mobile core network 140 also includes multiple control plane functions including, but not limited to, an Access and Mobility Management Function ("AMF") 143 that serves the RAN 120, a Session Management Function ("SMF") 145, a Policy Control Function ("PCF") 147, and a Unified Data Management function ("UDM") 149.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1A, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

While FIG. 1A depicts components of a 5G RAN and a 5G core network, the described embodiments apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF may be mapped to an MME, the SMF mapped to a control plane portion of a PGW and/or to an MME, the UPF map to an SGW and a user plane portion of the PGW, the UDM/UDR maps to an HSS, etc.

In the following descriptions, the term "gNB" is used for the base station but it is replaceable by any other radio access node, e.g., RAN node, eNB, BS, eNB, gNB, AP, NR, etc. Further the operations are described mainly in the context of 5G NR. However, the proposed solutions/methods are also equally applicable to other mobile communication systems supporting timing and frequency adjustments in non-terrestrial networks.

Figure 1B:
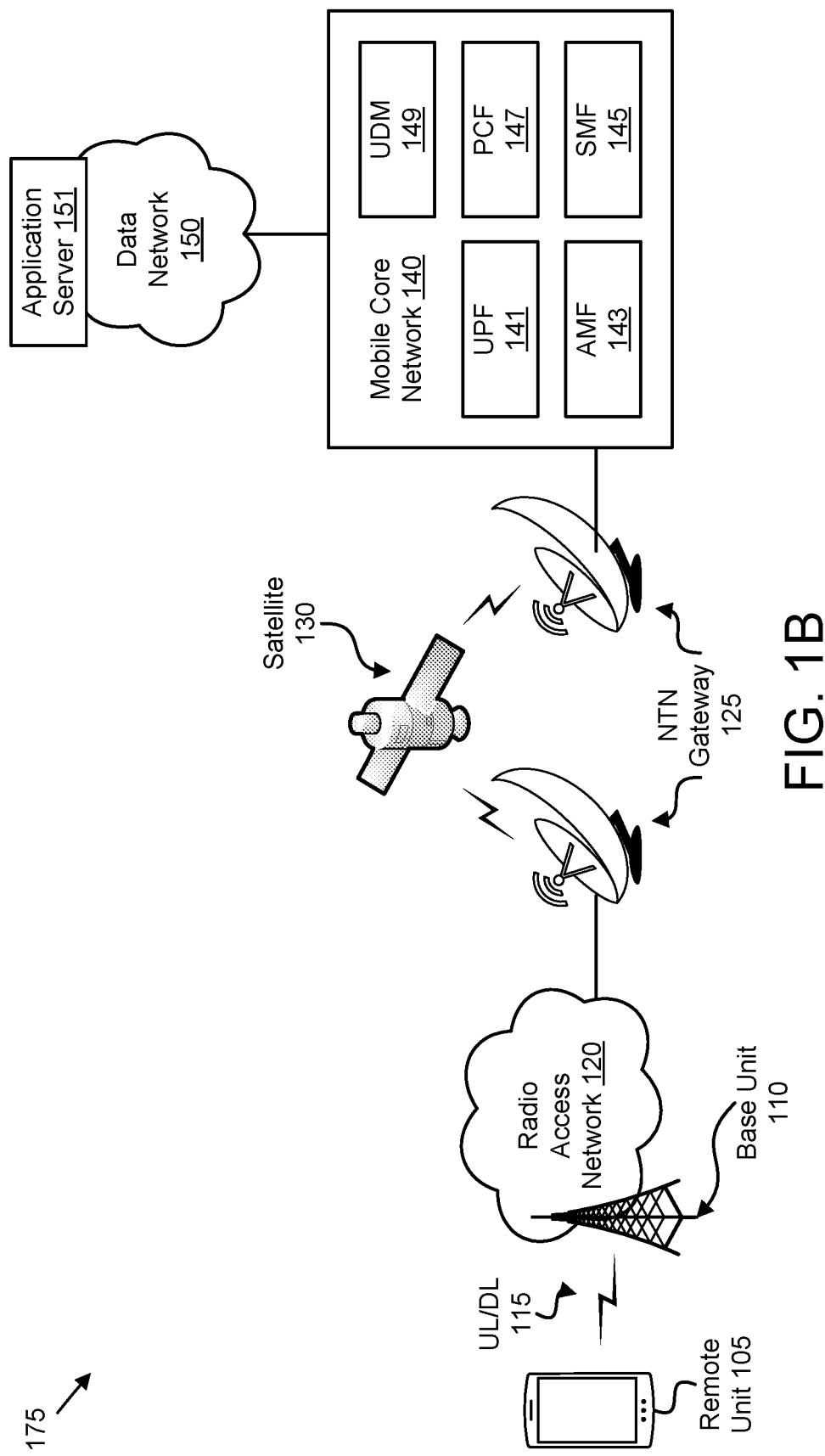
FIG. 1B is a schematic block diagram illustrating one embodiment of another wireless communication system for timing and frequency adjustments in non-terrestrial networks, according to one or more embodiments of the present disclosure.

FIG. 1B depicts another wireless communication system 175 supporting random access procedure in non-terrestrial network, according to embodiments of the disclosure. FIG. 1B, in one embodiment, is substantially similar to the non-terrestrial network 100 depicted in FIG. 1A. In FIG. 1B, a remote unit 105 communicates directly with the base units 110 in the RAN 120 via uplink ("UL") and downlink ("DL") communication signals over wireless communication links 115. In an embodiment of a non-terrestrial network, the RAN 120 may communicate with a mobile core network 140 via an NTN gateway 125, which may be directly connected to the RAN 120, that communicates with a satellite 130. The satellite 130, in further embodiments, communicates with another NTN gateway 125 that is directly connected to the mobile core network 140.

In one embodiment, some or all of the base-station functionalities may be performed onboard the satellite 130 or other NT-TRP. such an embodiment, which may be referred to as "regenerative payload," may be the main use case for Doppler-based methods described below.

In certain embodiments, timing relationships and uplink timing for NTNs require enhancements to take into consideration long propagation delays and moving cells in NTNs. For example, an airborne or spaceborne NT-TRP provides connectivity between a user equipment ("UE") via a "service link" and a network through a gateway via a "feeder link." The propagation delay in the service link is normally much larger than an access link in a terrestrial cellular system. Furthermore, except for the case of the NT-TRP on a geostationary satellite, the cells are potentially moving, possibly at a high speed in the case of low-earth orbit ("LEO") satellites, which require a continuous change of timing adjustments for uplink with respect to downlink. Yet furthermore, the changes are different for different beams as each beam makes a different angle with the ground station (UE), hence resulting in a different projection of the ephemeris. In one embodiment, these all require enhancements in the specification for timing adjustments for the uplink, and further enhancements may allow the system to optimize timing adjustments by predicting the movement and the future ephemeris of the NT-TRP.

Regarding transmission timing adjustments, A UE can be provided a value $N_{TA,offset}$ of a timing advance offset for a serving cell by n-TimingAdvanceOffset for the serving cell. If the UE is not provided n-TimingAdvanceOffset for a serving cell, the UE determines a default value $N_{TA,offset}$ of the timing advance offset for the serving cell.

If a UE is configured with two UL carriers for a serving cell, a same timing advance offset value $N_{TA,offset}$ applies to both carriers.

Upon reception of a timing advance command for a timing advance group ("TAG"), the UE adjusts uplink timing for physical uplink shared channel ("PUSCH")/sounding reference signal ("SRS")/physical uplink control channel ("PUCCH") transmission on all the serving cells in the TAG based on a value $N_{TA,offset}$ that the UE expects to be same for all the serving cells in the TAG and based on the received timing advance command where the uplink timing for PUSCH/SRS/PUCCH transmissions is the same for all the serving cells in the TAG.

For a band with synchronous contiguous intra-band EN-DC in a band combination with non-applicable maximum transmit timing difference requirements, e.g., as described in Note 1 of Table 7.5.3-1 of TS 38.133, if the UE indicates ul-TimingAlignmentEUTRA-NR as "required" and uplink transmission timing based on timing adjustment indication for a TAG from MCG and a TAG from SCG are determined to be different by the UE, the UE adjusts the transmission timing for PUSCH/SRS/PUCCH transmission on all serving cells part of the band with the synchronous contiguous intra-band EN-DC based on timing adjustment indication for a TAG from a serving cell in MCG in the band. The UE is not expected to transmit a PUSCH/SRS/PUCCH in one CG when the PUSCH/SRS/PUCCH is overlapping in time, even partially, with random access preamble transmitted in another CG.

For a SCS of $2^\mu \cdot 15$ kHz, the timing advance command for a TAG indicates the change of the uplink timing relative to the current uplink timing for the TAG in multiples of $16 \cdot 64 T_c / 2^\mu$.

In case of random access response, a timing advance command, $T_A$, for a TAG indicates $N_{TA}$ values by index values of $T_A = 0, 1, 2, \ldots, 3846$, where an amount of the time alignment for the TAG with SCS of $2^\mu \cdot 15$ kHz is $N_{TA} = T_A \cdot 16 \cdot 64 / 2^\mu$. $N_{TA}$, in one example, may be defined in TS 38.211, and is relative to the SCS of the first uplink transmission from the UE after the reception of the random access response.

In other cases, a timing advance command, $T_A$, for a TAG indicates adjustment of a current $N_{TA}$ value, $N_{TA\_old}$, to the new $N_{TA}$ value, $N_{TA\_new}$, by index values of $T_A = 0, 1, 2, \ldots, 63$, where for a SCS of $2^\mu \cdot 15$ kHz, $N_{TA\_new} = N_{TA\_old} + (T_A - 31) \cdot 16 \cdot 64 / 2^\mu$.

If a UE has multiple active UL bandwidth parts ("BWPs") in a same TAG, including UL BWPs in two UL carriers of a serving cell, the timing advance command value is relative to the largest SCS of the multiple active UL BWPs. The applicable $N_{TA\_new}$ value for an UL BWP with lower SCS may be rounded to align with the timing advance granularity for the UL BWP with the lower SCS while satisfying the timing advance accuracy requirements.

Adjustment of an $N_{TA}$ value by a positive or a negative amount indicates advancing or delaying the uplink transmission timing for the TAG by a corresponding amount, respectively.

For a timing advance command received on uplink slot n and for a transmission other than a PUSCH scheduled by a random access response ("RAR") UL grant or a PUCCH with HARQ-ACK information in response to a success RAR the corresponding adjustment of the uplink transmission timing applies from the beginning of uplink slot n+k+1 where $k = \lceil N_{slot}^{subframe,\mu} \cdot (N_{T,1} + N_{T,2} + N_{TA,max} + 0.5) / T_{sf} \rceil$, $N_{T,1}$ is a time duration in msec of N1 symbols corresponding to a physical downlink shared channel ("PDSCH") processing time for UE processing capability 1 when additional PDSCH DM-RS is configured, $N_{T,2}$ is a time duration in msec of $N_2$ symbols corresponding to a PUSCH preparation time for UE processing capability 1, $N_{TA,max}$ is the maximum timing advance value in msec that can be provided by a TA command field of 12 bits, $N_{slot}^{subframe,\mu}$ is the number of slots per subframe, and $T_{sf}$ is the subframe duration of 1 msec. $N_1$ and $N_2$ are determined with respect to the minimum SCS among the SCSs of all configured UL BWPs for all uplink carriers in the TAG and of all configured DL BWPs for the corresponding downlink carriers. For $\mu = 0$, the UE assumes $N_{1,0} = 14$. Slot n and $N_{slot}^{subframe,\mu}$ are determined with respect to the minimum SCS among the SCSs of all configured UL BWPs for all uplink carriers in the TAG. $N_{TA,max}$ is determined with respect to the minimum SCS among the SCSs of all configured UL BWPs for all uplink carriers in the TAG and for all configured initial UL BWPs provided by initialUplinkBWP. The uplink slot n is the last slot among uplink slot(s) overlapping with the slot(s) of PDSCH reception assuming $T_{TA}=0$, where the PDSCH provides the timing advance command and $T_{TA}$ is predefined, e.g., as in TS 38.211.

If a UE changes an active UL BWP between a time of a timing advance command reception and a time of applying a corresponding adjustment for the uplink transmission timing, the UE determines the timing advance command value based on the SCS of the new active UL BWP. If the UE changes an active UL BWP after applying an adjustment for the uplink transmission timing, the UE assumes a same absolute timing advance command value before and after the active UL BWP change.

If the received downlink timing changes and is not compensated or is only partly compensated by the uplink timing adjustment without timing advance command, the UE changes $N_{TA}$ accordingly.

If two adjacent slots overlap due to a TA command, the latter slot is reduced in duration relative to the former slot.

Regarding timing advance adjustments, the timing advance is initiated from gNB to UE in EN-DC, NR-DC, NE-DC, and NR SA operation modes, with MAC message that implies and adjustment of the timing advance, e.g., as defined in clause 5.2 of TS 38.321. In one embodiment, the UE adjusts the timing of its uplink transmission timing at time slot n+k+1 for a timing advance command received in time slot n, and the value of k is predefined, e.g., as in clause 4.2 of TS 38.213. The same requirement may also apply when the UE is not able to transmit a configured uplink transmission due to the channel assessment procedure.

Regarding timing advance adjustment accuracy, the UE shall adjust the timing of its transmissions with a relative accuracy better than or equal to the UE Timing Advance adjustment accuracy requirement a shown in Table 200 of FIG. 2, to the signaled timing advance value compared to the timing of preceding uplink transmission.

Regarding UE transmit timing, in one embodiment, the UE shall have capability to follow the frame timing change of the reference cell in connected state. The uplink frame transmission, in one embodiment, takes place $(N_{TA}+N_{TA\ offset}) \times T_c$ before the reception of the first detected path (in time) of the corresponding downlink frame from the reference cell. For serving cell(s) in PTAG, in one embodiment, the UE shall use the SpCell as the reference cell for deriving the UE transmit timing for cells in the PTAG. For serving cell(s) in STAG, in one embodiment, the UE shall use any of the activated SCells as the reference cell for deriving the UE transmit timing for the cells in the STAG. UE initial transmit timing accuracy, gradual timing adjustment requirements, and one-shot timing adjustment requirements, in one embodiment, are defined in the following requirements:

The UE initial transmission timing error, in one embodiment, shall be less than or equal to $\pm T_c$ where the timing error limit value $T_c$ is specified in Table 300 of FIG. 3. This requirement may apply when it is the first transmission in a DRX cycle for PUCCH, PUSCH and SRS or it is the physical random access channel ("PRACH") transmission.

The UE, in one embodiment, shall meet the $T_c$ requirement for an initial transmission provided that at least one SSB is available at the UE during the last 160 ms. The reference point for the UE initial transmit timing control requirement, in one embodiment, shall be the downlink timing of the reference cell minus $(N_{TA}+N_{TA\ offset}) \times T_c$. The downlink timing, in one embodiment, is defined as the time when the first detected path (in time) of the corresponding downlink frame is received from the reference cell. $N_{TA}$ for PRACH is defined as 0.

$(N_{TA}+N_{TA\ offset}) \times T_c$ (in $T_c$ units) for other channels, in one embodiment, is the difference between UE transmission timing and the downlink timing immediately after when the last timing advance was applied. $N_{TA}$ for other channels, in one embodiment, is not changed until next timing advance is received. The value of $N_{TA\ offset}$, in one embodiment, depends on the duplex mode of the cell in which the uplink transmission takes place and the frequency range (FR). $N_{TA\ offset}$ is defined in Table 400 of FIG. 4.

When it is not the first transmission in a DRX cycle or there is no DRX cycle, and when it is the transmission for PUCCH, PUSCH and SRS transmission, in one embodiment, the UE shall be capable of changing the transmission timing according to the received downlink frame of the reference cell except when the timing advance is applied.

Regarding uplink timing advance/RACH procedure, in general, the following aspects are applicable:
DL synchronization via SSB
Random access via PRACH
Maintenance for UL timing advance and frequency synchronization The evaluations and analysis, in one embodiment, are conducted considering on characteristics of satellite communication systems, e.g., possibly large cell coverage and high Doppler. Meanwhile, the impacts due to some typical implementations in existing satellite systems, e.g., partial frequency pre-compensation for DL and timing post-compensation at satellite network side, are also considered. According to the corresponding results, solutions, and conclusions along with some observations are presented below.

Regarding DL synchronization via SSB, in one embodiment, the performance evaluation on the DL synchronization performance is conducted. It is observed that for DL initial synchronization, robust performance can be provided by the SSB design in Rel-15 in case of GEO and LEO with beam specific pre-compensation of common frequency shift, e.g., conducted with respect to the spot beam center at network side, respectively.

However, for the LEO without pre-compensation of the frequency offset, additional complexity may be needed at the UE receiver to achieve robust DL initial synchronization performance based on Rel-15 SSB. No further enhancement on the SSB may be needed.

Regarding random access, in one embodiment, it is observed that with assumption on pre-compensation of timing and frequency offset (e.g., if UE knowledge of geo-location of the UE at the requisite level of accuracy is available) at UE side for UL transmission, existing Rel-15 PRACH formats and preamble sequences can be reused.

However, in case pre-compensation of timing and frequency offset is not performed at UE side for UL transmission, in one embodiment, enhanced PRACH formats and/or preamble sequences may be supported with following options:
Option-1: A single Zadoff-Chu sequence based on larger SCS, repetition number. Additional usage of CP and Ncs can be further determined in normative work.
Option-2: A solution based on multiple Zadoff-Chu sequences with different roots.
Option-3: Gold/m-sequence as preamble sequence with additional process, e.g., modulation and transform precoding.

Option-4: A single Zadoff-Chu sequence with combination of scrambling sequence.

Regarding maintenance for UL timing advance and frequency synchronization, with consideration on the larger cell coverage, long round trip time ("RTT"), and high Doppler, in one embodiment, enhancements are considered to ensure the performance for timing and frequency synchronization for UL transmission.

For the timing advance (TA) in the initial access and the subsequent TA maintenance, the following solutions, in one embodiment, are identified with an illustration of the definition of terminology given in FIG. 5:

Option 1: Autonomous acquisition of the TA at UE with UE known location and satellite ephemeris:

In this way, the required TA value for UL transmission including PRACH can be calculated by the UE. The corresponding adjustment can be done, either with UE-specific differential TA or full TA (consisting of UE specific differential TA and common TA).

With regard to the full TA compensation at the UE side, both the alignment on the UL timing among UEs and DL and UL frame timing at network side can be achieved. However, in case of satellite with transparent payload, further discussion on how to handle the impact introduced by feeder link will be conducted in normative work. Additional needs for the network to manage the timing offset between the DL and UL frame timing can be considered, if impacts introduced by feeder link is not compensated by UE in corresponding compensation.

With regard to the UE specific differential TA only, in one embodiment, additional indication on a single reference point should be signaled to UEs per beam/cell for achieving the UL timing alignment among UEs within the coverage of the same beam/cell. Timing offset between DL and UL frame timing at the network side should also be managed by the network regardless of the satellite payload type.

With concern on the accuracy on the self-calculated TA value at the UE side, in one embodiment, additional TA signaling from network to UE for TA refinement, e.g., during initial access and/or TA maintenance, can be determined in the normative work.

Option 2: Timing advanced adjustment based on network indication:

In one embodiment, the common TA, which refers to the common component of propagation delay shared by all UEs within the coverage of same satellite beam/cell, is broadcasted by the network per satellite beam/cell. The calculation of this common TA, in one embodiment, is conducted by the network with assumption on at least a single reference point per satellite beam/cell.

In one embodiment, the indication for UE-specific differential TA from network as the Rel-15 TA mechanism is also needed. For satisfying the larger coverage of NTNs, in one embodiment, extension of value range for TA indication in RAR, either explicitly or implicitly, is identified. Whether to support negative TA value in corresponding indication, in one embodiment, will be determined in the normative phase.

Moreover, in one embodiment, indication of timing drift rate, from the network to UE, is also supported to enable the TA adjustment at UE side. For calculation of common TA in the above two options, in one embodiment, single reference point per beam is considered as the baseline.

For the UL frequency compensation, in one embodiment, at least for LEO systems, the following solutions are identified with consideration on the beam specific post-compensation of common frequency offset at the network side:

Option-1: Both the estimation and pre-compensation of UE-specific frequency offset are conducted at the UE side. The acquisition of this value can be done by utilizing DL reference signals, UE location and satellite ephemeris.

Option-2: The required frequency offset for UL frequency compensation at least in LEO systems is indicated by the network to UE. The acquisition on this value can be done at the network side with detection of UL signals, e.g., preamble.

Indication of compensated frequency offset values by the network, in one embodiment, is also supported in case that compensation of the frequency offset is conducted by the network in the uplink and/or the downlink respectively. However, in one embodiment, indication of Doppler drift rate is not necessary.

In one embodiment, solutions are proposed for timing advance (TA) adjustments in NTN. The airborne or spaceborne communication entity that provides a service link to a UE, in one embodiment, is referred to as a non-terrestrial transmit-receive point (NT-TRP). It should be noted that the functionalities and the protocol stack implemented in the NT-TRP may be different in different scenarios, for example in the case of systems based on a transparent payload versus a regenerative payload. Communications from the UE to the NT-TRP, in one embodiment, are referred to as uplink and communications from the NT-TRP to the UE are referred to as downlink.

Figure 6A:
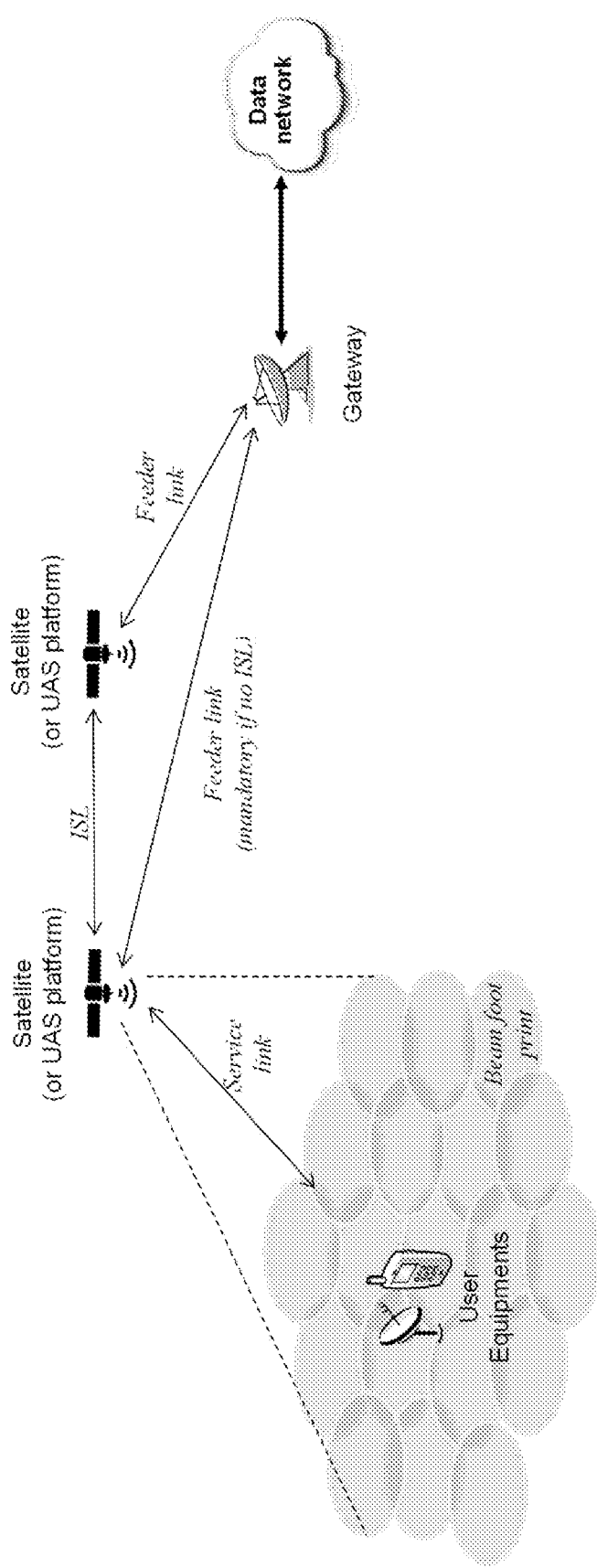
FIG. 6A depicts a diagram illustrating one embodiment of a scenario for an NTN based on regenerative payload, according to one or more embodiments of the present disclosure.
Figure 6B:
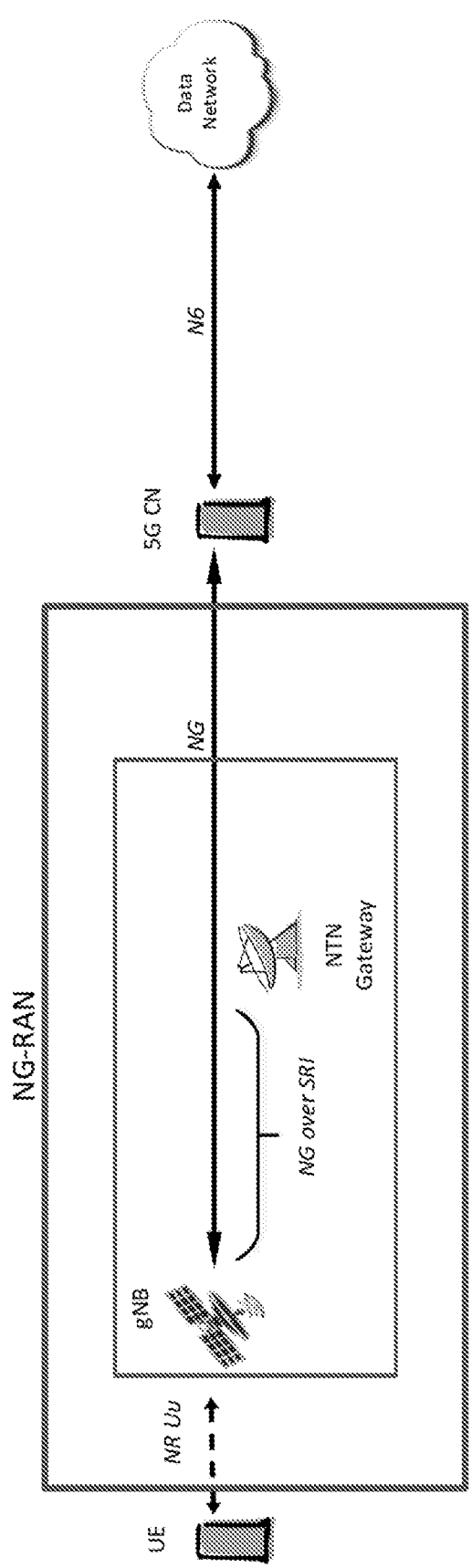
FIG. 6B depicts a diagram illustrating one embodiment of an architecture for an NTN based on regenerative payload, according to one or more embodiments of the present disclosure.
Figure 6C:
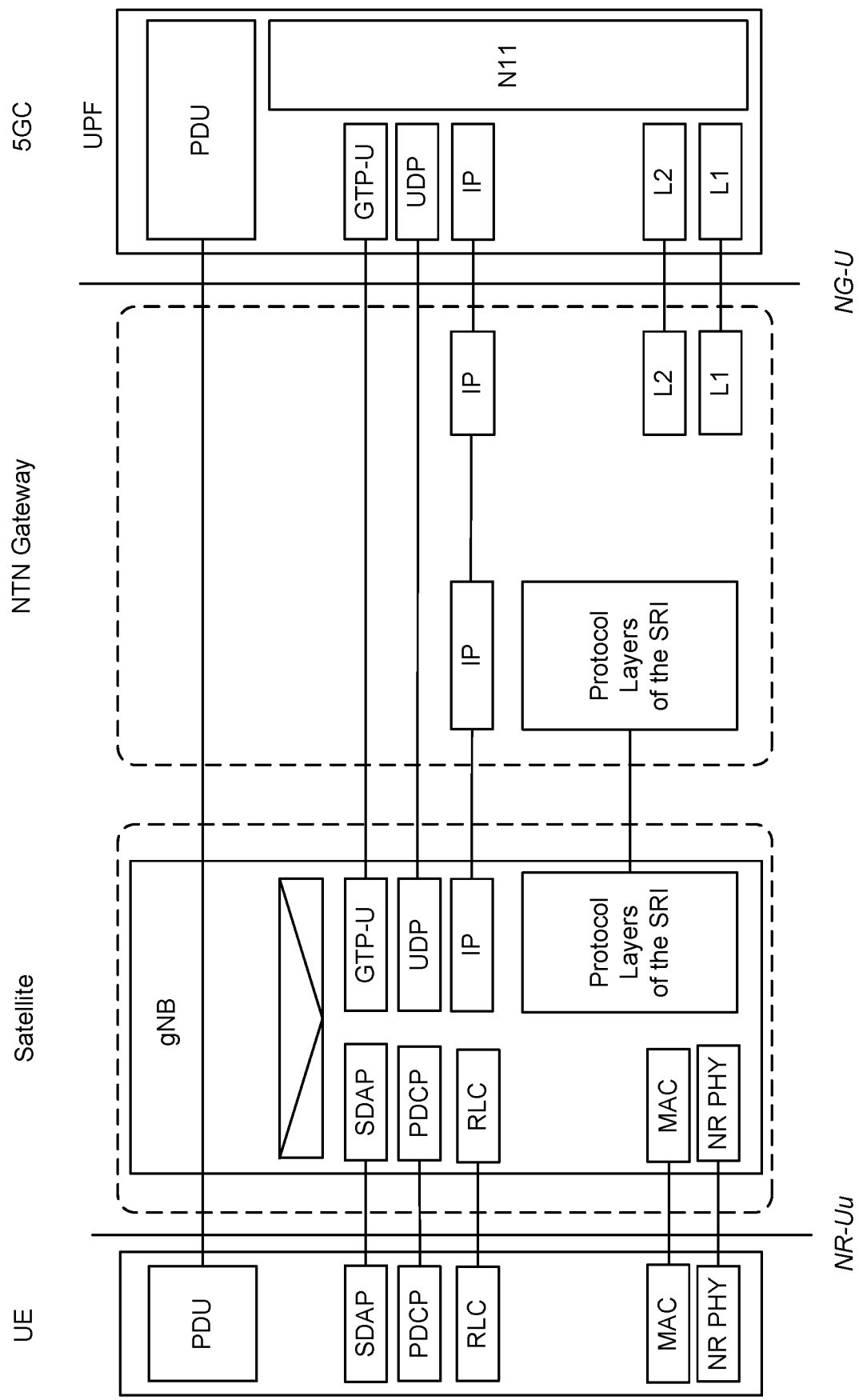
FIG. 6C depicts a diagram illustrating one embodiment of a user plane for an NTN based on regenerative payload, according to one or more embodiments of the present disclosure.
Figure 6D:
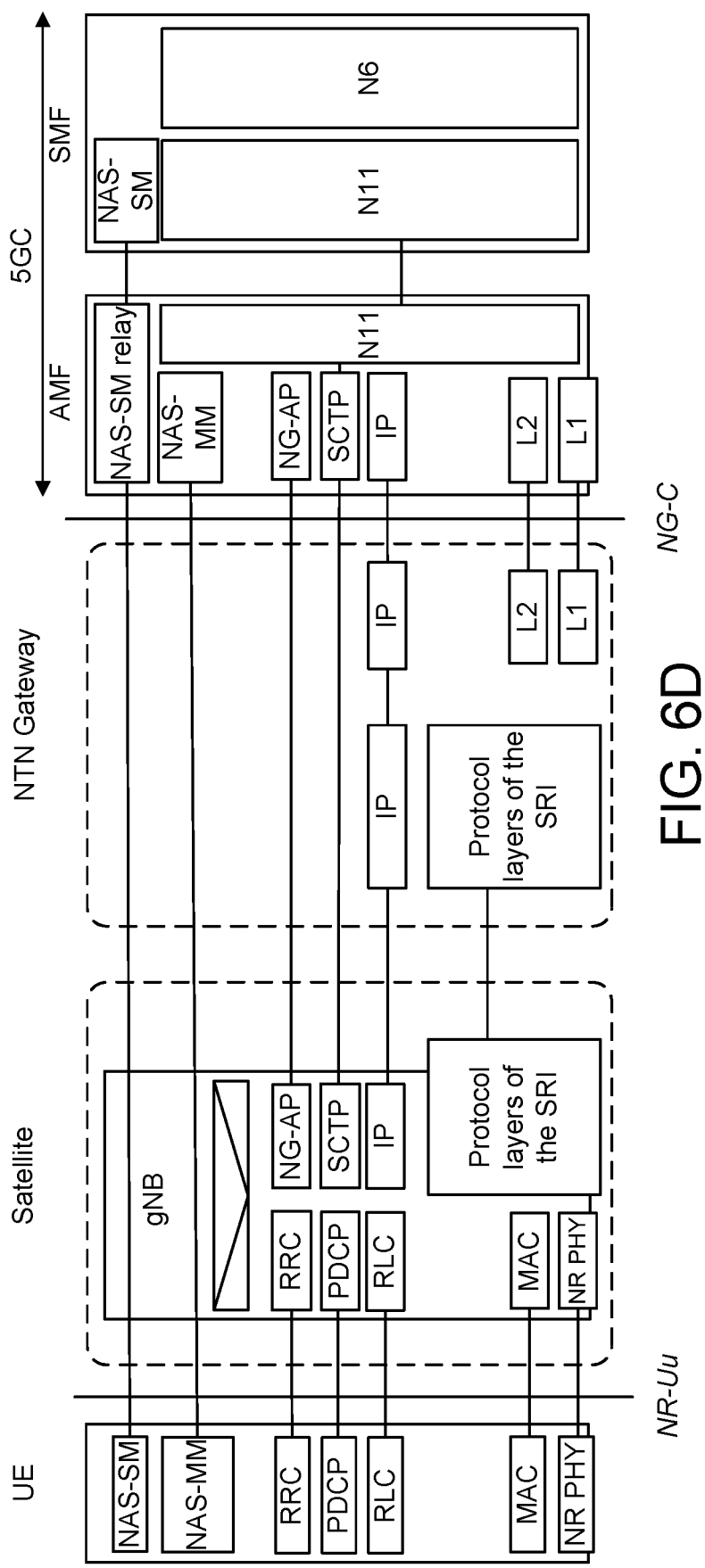
FIG. 6D depicts a diagram illustrating one embodiment of a control plane for an NTN based on regenerative payload, according to one or more embodiments of the present disclosure.

FIG. 6A illustrates one embodiment of an NTN system based on a regenerative payload. FIG. 6B illustrates the corresponding architecture of the NTN system based on a regenerative payload, and FIGS. 6C and 6D illustrate the corresponding user plane and control plane of the NTN system based on a regenerate payload.

Figure 7A:
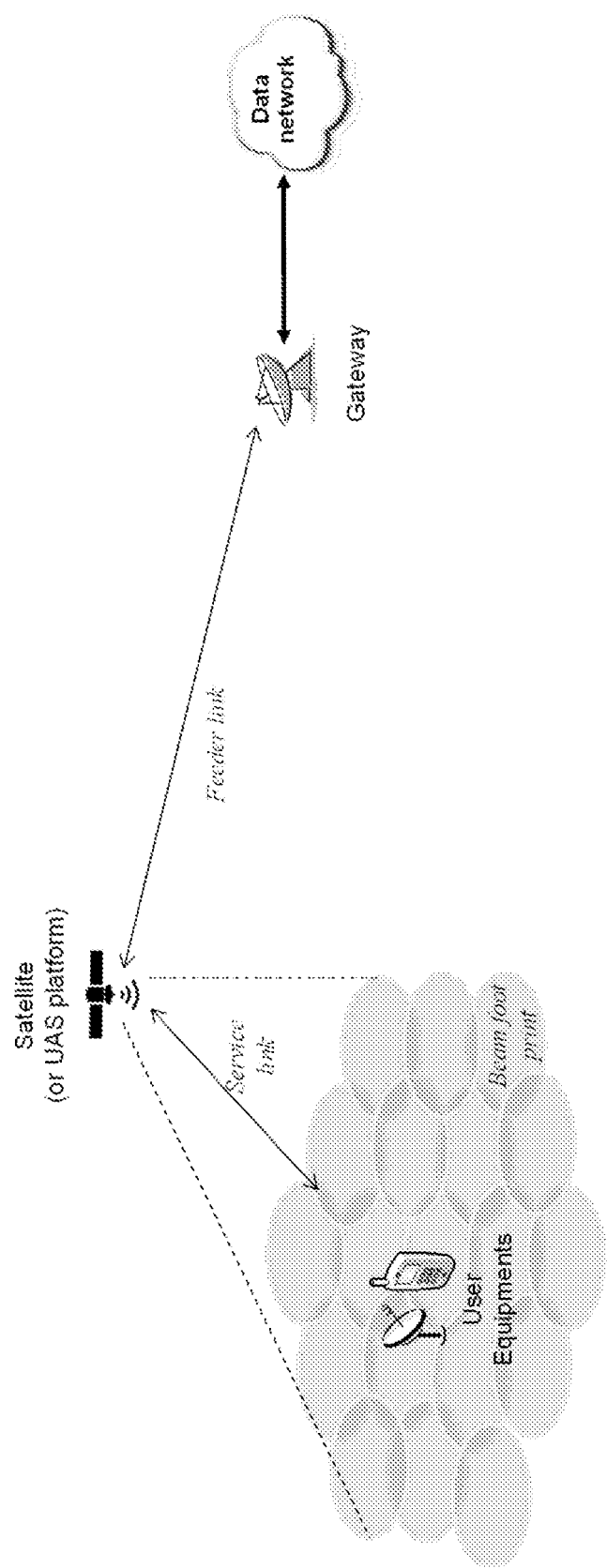
FIG. 7A depicts a diagram illustrating one embodiment of a scenario for an NTN based on transparent payload according to one or more embodiments of the present disclosure.
Figure 7B:
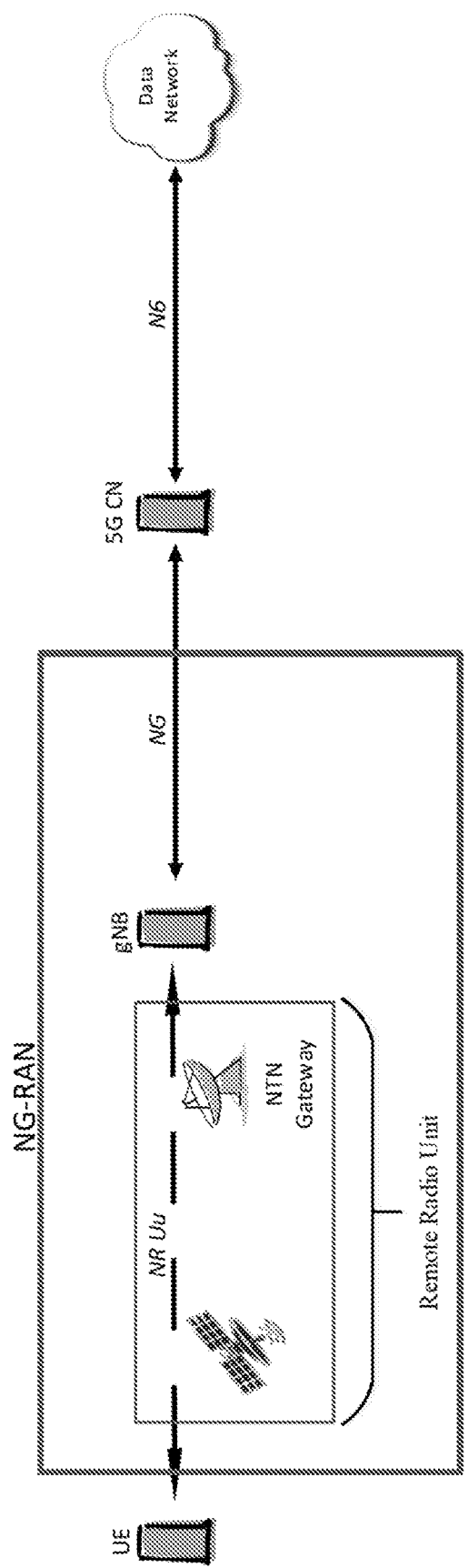
FIG. 7B depicts a diagram illustrating one embodiment of an architecture for an NTN based on transparent payload according to one or more embodiments of the present disclosure.
Figure 7C:
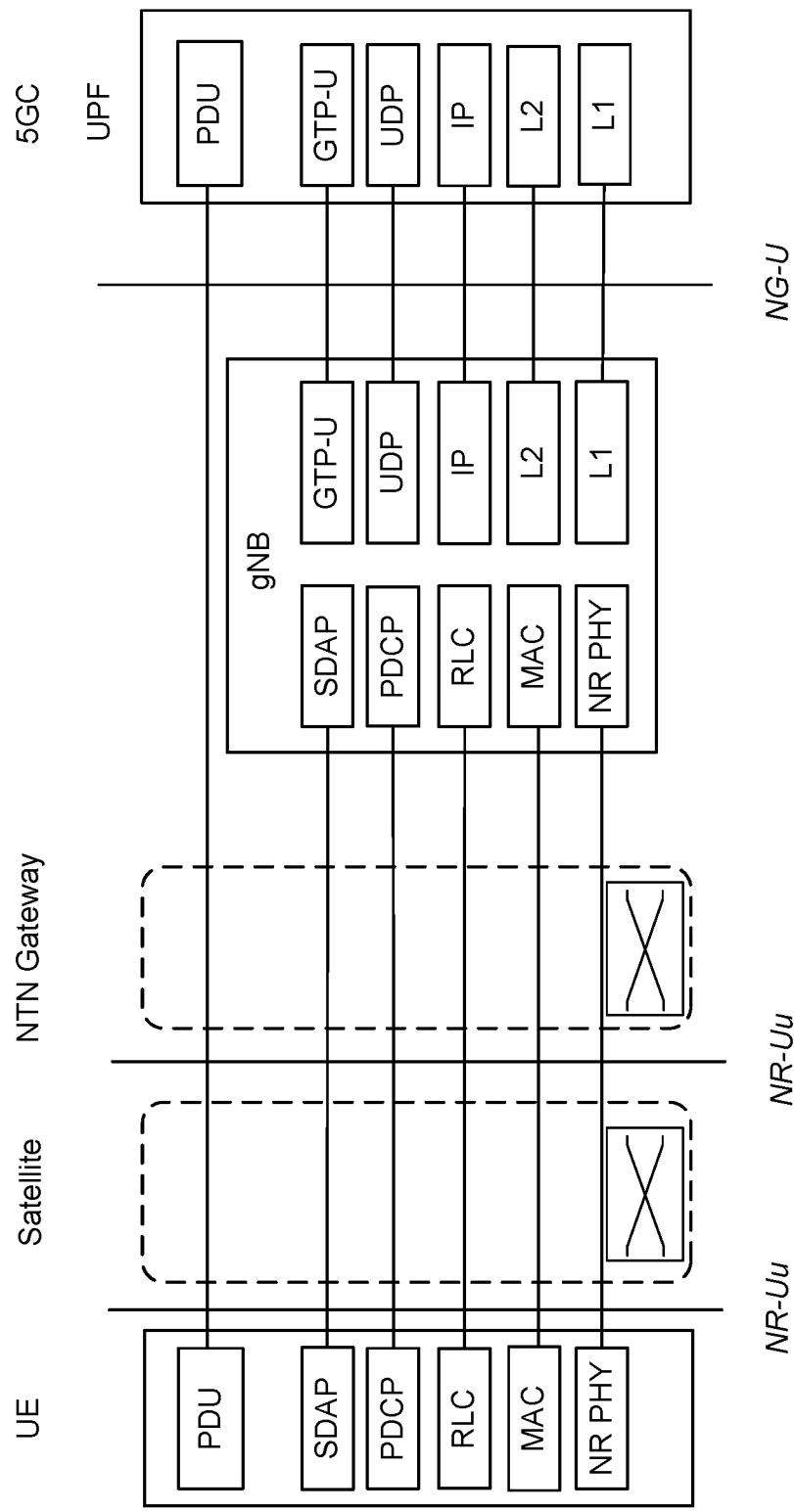
FIG. 7C depicts a diagram illustrating one embodiment of a user plane for an NTN based on transparent payload according to one or more embodiments of the present disclosure.
Figure 7D:
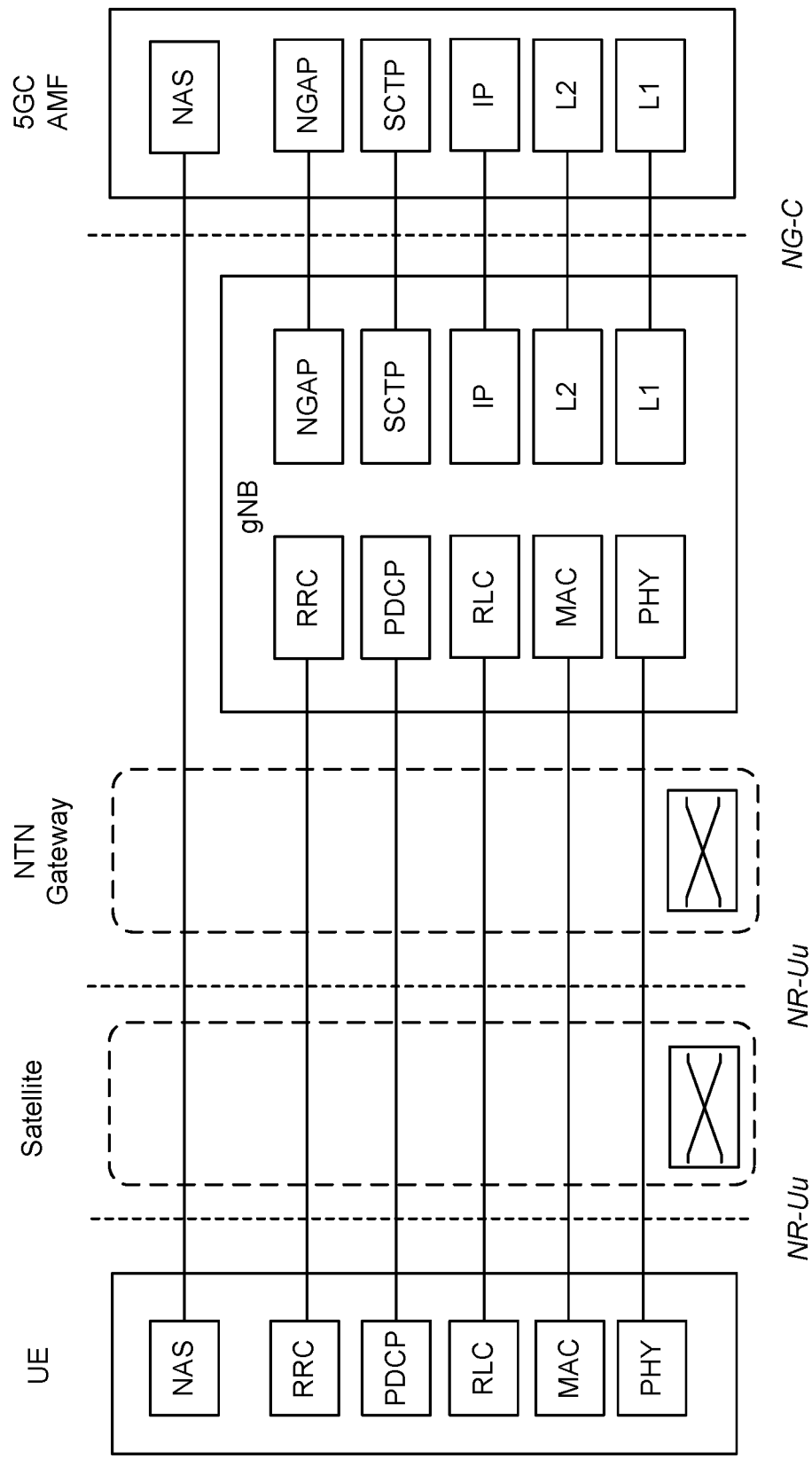
FIG. 7D depicts a diagram illustrating one embodiment of a control plane for an NTN based on transparent payload according to one or more embodiments of the present disclosure.

FIG. 7A illustrates one embodiment of an NTN system based on a transparent payload. FIG. 7B illustrates the corresponding architecture of the NTN system based on a regenerative payload, and FIGS. 7C and 7D illustrate the corresponding user plane and control plane of the NTN system based on a regenerate payload.

In transparent payload scenarios, in one embodiment, the airborne or spaceborne transceiver relays communications between a UE and a gateway without processing the payload. As a result, in one embodiment, TA signaling is generated by the gNB connected to the gateway and should consider the propagation delay of the feeder link.

Furthermore, in one embodiment, scenarios may be divided based on whether ephemeris (location and velocity information) of the NT-TRP is available and whether the UE is equipped with a global navigation satellite system ("GNSS") receiver such as a global positioning system ("GPS") receiver.

In one embodiment, a first method is proposed for the scenario with regenerative payload and with ephemeris/GNSS information:
1. NT-TRP transmits SS/PBCH block
2. NT-TRP broadcasts ephemeris information $G_{NW}$ in SIB
3. UE obtains its own location information $G_{UE}$ from GNSS
4. UE computes TA1 based on $G_{NW}$ and $G_{UE}$
5. UE transmits RACH preamble while applying TA1
6. NT-TRP transmits RAR containing TA2
7. UE transmits UL while applying TA1+TA2
8. NT-TRP transmits TA command containing TA3
9. UE applies TA3 on top of TA1+TA2

The above method comprises actions for an NT-TRP and a UE. In one embodiment, in the communication steps in this method (and other methods in this disclosure), when an NT-TRP transmits a signal, a UE may receive the signal, and vice versa.

More details on the above method are provided below. The terms satellite and NT-TRP may be used interchangeably in this disclosure. It should be noted, however, that the methods are not limited in scope to satellite systems and similar methods may be applied for to other types of non-terrestrial communication entities.

In step 1, in one embodiment, the NT-TRP transmits one or multiple SS/PBCH blocks. The UE, in one embodiment, may receive the SS/PBCH block(s) and perform synchronization, obtain system information, and so on.

In step 2, in one embodiment, the NT-TRP broadcasts satellite ephemeris information GNW, for example in a system information block ("SIB"). The satellite ephemeris information GNW, in one embodiment, comprises the satellite's 3D position and velocity. Alternatively, the ephemeris may contain only 3D position information and not velocity information.

An alternative to transmitting satellite position and/or velocity, in one embodiment, is transmitting a time stamp by the NT-TRP or satellite. An example of the time stamp is a parameter ReferenceTimeInfo-r16 as specified in NR Rel-16. In order to allow a unified framework, in one embodiment, it is assumed that GNW comprises the time stamp in order to realize this alternative. However, the configuration or parameter comprising the time stamp may be different from the configuration or parameter comprising satellite ephemeris according to the specification or implementation. In any case, in one embodiment, the notation GNW is used to denote the configuration or parameter that may comprise any or at least one or all of a position, a velocity, a time stamp, or any other information by which an ephemeris and/or a time stamp associated with an NT-TRP, a service link, or the like may be obtained.

In step 3, in one embodiment, the UE may obtain its own location information GUE, for example through a GNSS. An alternative to obtaining location information, in one embodiment, is obtaining a reference time. Similar to the above explanation on GNW, in one embodiment, the notation GUE is used to denote any or at least one or all of a position, a velocity, a reference time, or any other information by which a location, a velocity, or a reference time associated with the UE may be obtained.

In step 4, in one embodiment, the UE computes a timing advance value TA1 based on a location of the TRP, LTRP, e.g., 3D coordinates, and a location of the UE, LUE, e.g., 3D coordinates. For example, if GNW and GUE comprise, respectively, the NT-TRP ephemeris/position, PTRP, e.g., 3D coordinates and the UE position. PUE, e.g., 3D coordinates, TA1 can be computed by calculating the propagation delay associated with the distance between the NT-TRP and the UE, |PUE−PTRP|. Alternatively, in one embodiment, if GNW and GUE comprise, respectively, a time, a time stamp, or reference time associated with the TRP, TTRP, and UE time or reference time, TUE, associated with a reception time of a signal transmitted at TTRP, TA1 can be computed by calculating the time difference |TUE−TTRP|.

The UE, in one embodiment, may additionally compute a value of TA change over time, which may be referred to as a TA drift rate. The TA drift rate, in one embodiment, may be computed by different methods. If the UE obtains the velocity of the satellite, VTRP, and/or its own velocity, VUE, in one embodiment, the UE may compute a TA drift rate associated with the relative velocity, |VUE−VTRP|. In the special case that either the UE is not mobile (e.g., the UE receiver antenna is a very small aperture terminal ("VSAT") antenna), the UE cannot obtain its own velocity information, or otherwise the UE velocity is small compared to the NT-TRP velocity, VUE can be assumed to be zero for TA drift rate computations.

Alternatively, in one embodiment, if the satellite ephemeris comprises the satellite's 3D position and not velocity information, the UE may obtain a TA drift rate by computing a difference over successive position values associated with the NT-TRP. As another alternative, in one embodiment, if the UE obtains updated time stamp information from the NT-TRP and/or updated reference time information from the UE GNSS, a TA drift rate can be computed based on successive values of NT-TRP time stamp and UE reference time. As yet another alternative, in one embodiment, the UE obtains a TA drift rate by a separate signaling.

Furthermore, in one embodiment, a method for updating a value of TA based on Doppler measurements is proposed in the next section.

In one embodiment, Step 4 may be realized by an implementation and/or a configuration. This will be explained under unified configuration below.

In step 5, in one embodiment, the UE transmits a RACH preamble on a PRACH while applying the computed TA1. The UE, in one embodiment, obtains PRACH information from the system information and the PRACH transmission may be associated with the synchronization signal ("SS")/ physical broadcast channel ("PBCH") (or periodic CSI-RS) it received in step 1.

In step 6, once the NT-TRP receives the RACH preamble, in one embodiment, it transmits a RAR message. The RAR message may contain information of a new timing advance value (e.g., timing advance adjustment) TA2.

In step 7, in one embodiment, the UE applies TA2 for transmitting an uplink message such as a Msg3. In Step 8, in one embodiment, which may be performed frequently, the NT-TRP transmits a TA command comprising a new value of timing advance (TA3). Different options may be possible for this step. In Embodiment 1, TA3 does not comprise a TA drift rate or take a TA drift into account. In Embodiment 2, TA3 comprises a TA drift rate or takes a TA drift into account.

In step 9, in one embodiment, following reception of a TA command, the UE computes a new value of timing advance as follows:

For Embodiment 1: TAnew:=TAold+TA3+TAdrift, where TAdrift is obtained in step 8.

For Embodiment 2: TAnew:=TAold+TA3.

In some examples, if the received downlink timing changes and is not compensated or is only partly compensated by the uplink timing adjustment without timing advance command, the UE changes the value of the timing advance accordingly. Further details are provided below with respect to the unified method.

In one embodiment, a method is proposed for the scenario with regenerative payload and without ephemeris/GNSS information:

1. NT-TRP transmits SS/PBCH block
2. NT-TRP broadcasts $TA_{ref}$ in SIB
3. UE transmits RACH preamble while applying TA1: =$TA_{ref}$
4. NT-TRP transmits RAR containing TA2
5. UE transmits UL while applying TA1+TA2
6. NT-TRP transmits TA command containing TA3
7. UE applies TA3 on top of TA1+TA2

In step 1, in one embodiment, the NT-TRP transmits one or multiple SS/PBCH blocks. The UE may receive the SS/PBCH block(s) and perform synchronization, obtain system information, and so on.

In step 2, in one embodiment, the NT-TRP broadcasts a reference timing advance TAref, for example in a system information block ("SIB"). The reference TA may consider the TA change due to a propagation delay from the satellite to the ground as well as a delay to apply the reference TA.

In Step 3, in one embodiment, the UE transmits a RACH preamble on a PRACH while applying a timing advance TA1:=TAref. The UE, in one embodiment, obtains PRACH information from the system information and the PRACH transmission may be associated with the SS/PBCH (or periodic CSI-RS) it received in step 1.

Once the NT-TRP receives the RACH preamble, in one embodiment, it transmits a RAR message in Step 4. The RAR message may contain information of a new timing advance value (e.g., timing advance adjustment) TA2. The value of TA2 may be significantly different for different UEs as the delay computed for propagation from the satellite to the ground corresponds to a reference point on the ground, while UEs are expected to be spatially scattered.

In step 5, in one embodiment, the UE applies TA2 for transmitting an uplink message such as a Msg3. In Step 6, in one embodiment, which is performed frequently, the NT-TRP transmits a TA command comprising a new value of timing advance (TA3). Different options are possible for this step. In some embodiments (Embodiment 1), TA3 does not comprise a TA drift rate or take a TA drift into account. In Embodiment 1a, the NT-TRP transmits a control message such as a MAC CE message containing a value of TAdrift separately. In Embodiment 1b, the NT-TRP transmits a control message such as a MAC CE message containing a value of TAdrift as a function of a Doppler shift. The Doppler shift may be associated to one or multiple SS/PBCH blocks. In other embodiments (Embodiment 2), TA3 comprises a TA drift rate or takes a TA drift into account.

In step 7, in one embodiment, following reception of a TA command, the UE computes a new value of timing advance as follows:

For Embodiment 1: TAnew:=TAold+TA3+TAdrift, where TAdrift is obtained in step 6.

For Embodiment 2: TAnew:=TAold+TA3.

In some examples, if the received downlink timing changes and is not compensated or is only partly compensated by the uplink timing adjustment without timing advance command, the UE changes the value of the timing advance accordingly. Further details are discussed below with regard to the unified method.

In one embodiment, a method for a scenario with transparent payload and with ephemeris/GNSS information is discussed.

1. NT-TRP transmits SS/PBCH block
2. NT-TRP broadcasts ephemeris of NT-TRP (and GW) $G_{NW}$ in SIB
3. UE obtains its own location information $G_{UE}$ from GNSS
4. UE computes TA1 based on $G_{NW}$ and $G_{UE}$
5. UE transmits RACH preamble while applying TA1
6. NT-TRP transmits RAR containing TA2
7. UE transmits UL while applying TA1+TA2
8. NT-TRP transmits TA command containing TA3
9. UE applies TA3 on top of TA1+TA2

In step 1, in one embodiment, the NT-TRP transmits one or multiple SS/PBCH blocks. The UE may receive the SS/PBCH block(s) and perform synchronization, obtain system information, and so on.

In step 2, in one embodiment, the NT-TRP broadcasts satellite ephemeris information GNW, for example in a system information block ("SIB"). The satellite ephemeris information GNW, in one embodiment, comprises the satellite's 3D position and velocity. Alternatively, in one embodiment, the ephemeris information may contain only 3D position information and not velocity information. In this scenario, in one embodiment, since messages are originated from a gateway ("GW"), GNW may contain additional information associated with the feeder link. For example, the additional information may comprise information for the gateway location or a propagation delay between the gateway and the satellite. Note that, in one embodiment, the gNB on the ground may obtain satellite ephemeris or feeder link propagation delay through a separate satellite radio interface ("SRI") that may not be based on NR.

An alternative to transmitting satellite and/or gateway position and/or velocity, in one embodiment, is transmitting a time stamp by the NT-TRP or satellite. As an example of the time stamp is a parameter ReferenceTimeInfo-r16 as specified in NR Rel-16. In order to allow a unified framework, in one embodiment, it is assumed that GNW comprises the time stamp in order to realize this alternative. However, in one embodiment, the configuration or parameter comprising the time stamp may be different from the configuration or parameter comprising satellite and/or gateway ephemeris information according to the specification or implementation. In any case, in one embodiment, the notation GNW is used to denote the configuration or parameter that may comprise any or at least one or all of a position, a velocity, a time stamp, or any other information by which an ephemeris and/or a time stamp associated with an NT-TRP, a gateway ("GW"), a feeder link, a service link, an inter-satellite link, and/or the like may be obtained.

In step 3, in one embodiment, the UE may obtain its own location information GUE, for example through a GNSS. An alternative to obtaining location information, in one embodiment, is obtaining a reference time. Similar to the above explanation on GNW, in one embodiment, the notation GUE is used to denote any or at least one or all of a position, a velocity, a reference time, or any other information by which a location, a velocity, or a reference time associated with the UE may be obtained.

In step 4, in one embodiment, the UE computes a timing advance value TA1 based on GNW and GUE. For example, if GNW comprises the NT-TRP ephemeris PTRP and the GW position PGW, and if LTRP comprises the UE position PUE, TA1 can be computed by calculating the propagation delay associated with the distance between the gateway and the NT-TRP plus the distance between the NT-TRP and the UE, |PTRP−PGW|+|PUE−PTRP|. Note that in the case of multi-hop satellite networks, in one embodiment, propagation delays associated with inter-satellite links ("ISLs") may need to be added as well.

Alternatively, if timing information is available, in one embodiment, the propagation delay may be computed by the timing information. For example, if GNW comprises a time stamp TGW associated with the gateway, and if GUE comprises a UE reference time TUE associated with a reception time of a signal transmitted at TGW, TA1 can be computed by calculating the time difference |TUE−TGW|. As another example, the UE may compute a total propagation delay as the sum of multiple terms such as a service link delay, a feeder link delay, and possibly inter-satellite link delays. Each of these terms may be computed as time differences |T2−T1| or propagation delays |P2−P1|/c according to the information provided by network ephemeris and UE GNSS. In this example, each of T1, T2, P1, P2 may be associated with a UE, a gateway, a serving satellite or NT-TRP, an intermediate satellite in a multi-hop system, or a like, and c denotes the speed of light.

The UE, in one embodiment, may additionally compute a value of TA change over time, which may be referred to as a TA drift rate. The TA drift rate may be computed by different methods. If the UE obtains velocity information such its own velocity VUE as well as a velocity of the serving satellite VTRP, a velocity of the gateway VGW, a velocity of an intermediate satellite in a multi-hop system, and/or a like, in one embodiment, the UE may compute a TA drift rate associated with the relative velocity |VUE−VTRP|, |VUE−VGW|, and so on. In the special case that either the UE and/or the gateway is not mobile (for example the UE receiver antenna is a very small aperture terminal ("VSAT") antenna, the UE/GW does not obtain/report its velocity information, or otherwise the UE/GW velocity is small compared to the NT-TRP velocity, in one embodiment, VUE and/or VGW can be assumed zero for TA drift rate computations.

Alternatively, in one embodiment, if the satellite ephemeris comprises the satellite's 3D position and not velocity information, the UE may obtain a TA drift rate by computing a difference over successive position values associated with the NT-TRP. As another alternative, in one embodiment, if the UE can obtain updated time stamp information from the NT-TRP and/or updated reference time information from the UE GNSS, a TA drift rate can be computed based on successive values of NT-TRP time stamp and UE reference time. As yet another alternative, in one embodiment, the UE may obtain a TA drift rate by a separate signaling In step 5, in one embodiment, the UE transmits a RACH preamble on a PRACH while applying the computed TA1. The UE, in one embodiment, obtains PRACH information from the system information and the PRACH transmission may be associated with the SS/PBCH (or periodic CSI-RS) it received in step 1.

In step 6, once the NT-TRP receives the RACH preamble, in one embodiment, it transmits a RAR message. The RAR message may contain information of a new timing advance value (e.g., timing advance adjustment) TA2.

In step 7, in one embodiment, the UE applies TA2 for transmitting an uplink message such as a Msg3. In step 8, in one embodiment, which is performed frequently, the NT-TRP transmits a TA command comprising a new value of timing advance (TA3). Different options are possible for this step. In some embodiments (Embodiment 1), TA3 does not comprise a TA drift rate or take a TA drift into account. In other embodiments (Embodiment 2), TA3 comprises a TA drift rate or takes a TA drift into account.

Then, in step 9, following reception of a TA command, the UE computes a new value of timing advance as follows:

For Embodiment 1: TAnew:=TAold+TA3+TAdrift, where TAdrift is obtained in step 8.

For Embodiment 2: TAnew:=TAold+TA3.

In some examples, if the received downlink timing changes and is not compensated or is only partly compensated by the uplink timing adjustment without timing advance command, the UE changes the value of the timing advance accordingly.

In a further embodiment, a method is disclosed for the scenario with transparent payload and without ephemeris/GNSS information.

1. NT-TRP transmits SS/PBCH block
2. NT-TRP broadcasts TAref in SIB
3. UE transmits RACH preamble while applying TA1:=TAref
4. NT-TRP transmits RAR containing TA2
5. UE transmits UL while applying TA1+TA2
6. NT-TRP transmits TA command containing TA3
7. UE applies TA3 on top of TA1+TA2

In step 1, in one embodiment, the NT-TRP transmits one or multiple SS/PBCH blocks. The UE may receive the SS/PBCH block(s) and perform synchronization, obtain system information, and so on.

In step 2, in one embodiment, the NT-TRP broadcasts a reference timing advance TAref, for example in a system information block ("SIB"). The reference TA may consider the TA change due to a propagation delay from a gateway to the satellite and then to the ground as well as a delay to apply the reference TA.

In Step 3, in one embodiment, the UE transmits a RACH preamble on a PRACH while applying a timing advance TA1=TAref. The UE obtains PRACH information from the system information and the PRACH transmission may be associated with the SS/PBCH (or periodic CSI-RS) it received in step 1.

Once the NT-TRP receives the RACH preamble, in one embodiment, it transmits a RAR message in step 4. The RAR message may contain information of a new timing advance value (e.g., timing advance adjustment) TA2. The value of TA2 may be significantly different for different UEs as the delay computed for propagation from the satellite to the ground corresponds to a reference point on the ground, while UEs are expected to be spatially scattered.

In Step 5, in one embodiment, the UE applies TA2 for transmitting an uplink message such as a Msg3. In Step 6, in one embodiment, which is performed frequently, the NT-TRP transmits a TA command comprising a new value of timing advance (TA3). Different options are possible for this step. In some embodiments (Embodiment 1), TA3 does not comprise a TA drift rate or take a TA drift into account. In Embodiment 1a, the NT-TRP transmits a control message such as a MAC CE message containing a value of TAdrift separately. In Embodiment 1b, the NT-TRP transmits a control message such as a MAC CE message containing a value of TAdrift as a function of a Doppler shift. The Doppler shift may be associated to one or multiple SS/PBCH blocks. In other embodiments (Embodiment 2), TA3 comprises a TA drift rate or takes a TA drift into account.

In step 7, following reception of a TA command, in one embodiment, the UE computes a new value of timing advance as follows:

For Embodiment 1: TAnew:=TAold+TA3+TAdrift, where TAdrift is obtained in step 6.

For Embodiment 2: TAnew:=TAold+TA3.

In some examples, if the received downlink timing changes and is not compensated or is only partly compensated by the uplink timing adjustment without timing advance command, the UE changes the value of the timing advance accordingly.

The foregoing methods have differences in steps and details based on availability of location/velocity information and whether the system is based on a regenerative payload or a transparent payload.

In addition to the above embodiments, further cases may need to be considered for standardization when other types of relays (such as smart repeaters) are employed as the NT-TRP, when multiple NT-TRPs are connected through inter-satellite links ("ISLs"), when UEs are non-terrestrial, and/or the like.

The NTN feature in NR, in one embodiment, is expected to cover all the above scenarios and any other scenarios that may or may not be currently under consideration. Therefore, a flexible unified framework for systems and methods are desirable, especially at early stages of standardization.

Figure 8:
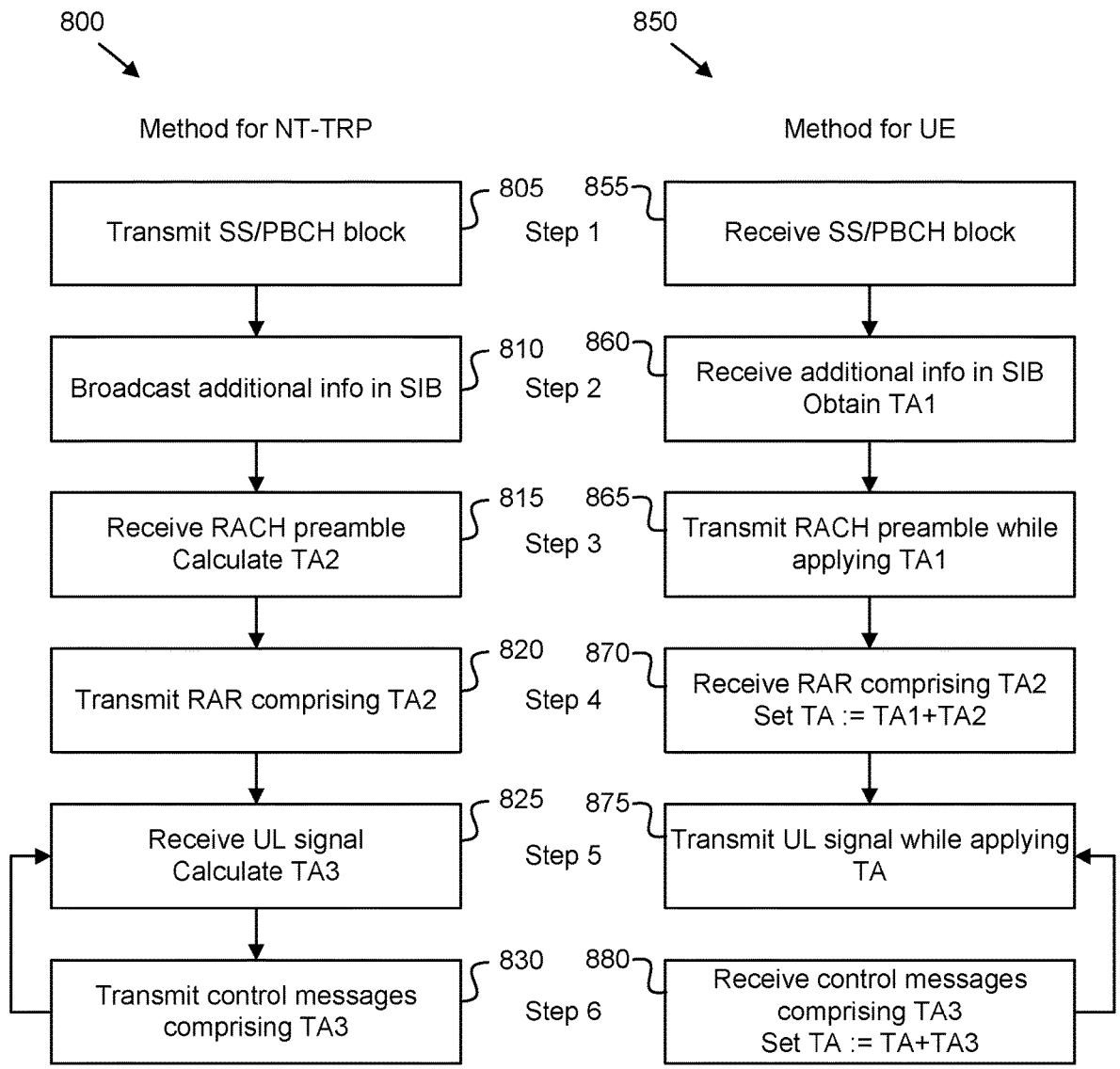
FIG. 8 depicts a diagram illustrating one embodiment of unified methods for timing adjustment at NT-TRP and UE according to one or more embodiments of the present disclosure.

FIG. 8 presents flowcharts for a unified method for timing adjustment in NTN.

Regarding the method for the NT-TRP 800, in Step 1 805, the NT-TRP transmits one or multiple SS/PBCH blocks. The NT-TRP may or may not apply Doppler pre-compensation for transmitting an SS/PBCH block. A Doppler pre-compensation, as used herein, may refer to a frequency shift in the transmitter, here the NT-TRP, that aims at compensating a shift in the radio frequency, fully or partially, as perceived by a receiver, here a UE, due to mobility. In the case that the NT-TRP applies a Doppler pre-compensation to an SS/PBCH block transmission (e.g., beam specific pre-compensation of common frequency shift), in one embodiment, the frequency shift aims at compensating the Doppler shift as perceived at/with respect to a reference point (e.g., spot beam center), normally on the ground. Hence, the SS/PBCH block may still be shifted due to Doppler as perceived by UEs at other geographical areas.

In Step 2 810, in one embodiment, the NT-TRP broadcasts additional information, for example in one or multiple system information blocks ("SIBs"). The broadcast information may comprise information according to a legacy terrestrial network such as information of random-access channel ("RACH") configuration e.g., RACH preambles, RACH occasions, and/or the like. Furthermore, the broadcast information may comprise additional information specific to NTN such as the following:

Information of the NTN:
  i. A type of the vehicle on which the NT-TRP is deployed, e.g., a GEO satellite, a LEO satellite, a UAV, a balloon, and so on. Additionally, or alternatively, an altitude from a nadir point and/or an absolute value of the velocity of the vehicle may be used.
  ii. Architecture/protocol information, e.g., whether the service link is provided by a regenerative-payload NT-TRP, a transparent-payload NT-TRP, a smart repeater, and so on. In the case of a regenerative-payload NT-TRP, information of a CU-DU split may also be provided.
  iii. Topology information such as multi-hop information.

Location of the satellite/UAV on which the NT-TRP is deployed.

Velocity of the satellite/UAV on which the NT-TRP is deployed.

Location of a reference point (normally on the ground).

Location of a gateway that connects the NT-TRP to a core network.

Location(s) of one or more intermediate satellites/UAVs connected via inter-satellite links (ISLs) in a multi-hop NTN.

Velocity(ies) of one or more intermediate satellites/UAVs connected via inter-satellite links (ISLs) in a multi-hop NTN.

Propagation delay of a service link, e.g., propagation delay from the satellite/UAV to a reference point (normally on the ground).
  i. Drift rate of the above propagation delay as a function of time.
  ii. Drift rate of the above propagation delay as a function of a Doppler shift. The Doppler shift may be associated with an SS/PBCH block and may be indicated by an index to the SS/PBCH block.

Propagation delay of a feeder link, e.g., propagation delay from a gateway to the satellite/UAV.
  i. Drift rate of the above propagation delay as a function of time.
  ii. Drift rate of the above propagation delay as a function of a Doppler shift. The Doppler shift may be associated with an SS/PBCH block and may be indicated by an index to the SS/PBCH block.

Propagation delay(s) of inter-satellite links (ISLs) in a multi-hop NTN.
  i. Drift rate of the above propagation delay as a function of time.
  ii. Drift rate of the above propagation delay as a function of a Doppler shift. The Doppler shift may be associated with an SS/PBCH block and may be indicated by an index to the SS/PBCH block.

Information of Doppler pre-compensation. The information may indicate whether a Doppler pre-compensation is applied when transmitting an SS/PBCH block; an amount of Doppler pre-compensation in units of frequency or parts per million (ppm) or in multiples of SS/PBCH block subcarrier spacing; and so on.

In Step 3 815, in one embodiment, the NT-TRP monitors an initial access channel such as a physical random-access channel ("PRACH"). The NT-TRP, in one embodiment, takes propagation delays into account when scheduling and monitoring resources for an initial access. Upon receiving an initial access message such as a random-access channel (RACH) preamble, in one embodiment, the NT-TRP may compute a timing advance adjustment value TA2. This value may be positive, zero, or negative.

In Step 4 820, in one embodiment, the NT-TRP transmits a response to the initial access message such as a random-access response ("RAR"). The RAR may comprise the timing advance adjustment value TA2.

In Step 5 825, in one embodiment, the NT-TRP computes a new timing advance adjustment value TA3 to be added to the current value of timing advance. The value of TA3 may be positive, zero, or negative.

In Step 6 830, in one embodiment, the NT-TRP transmits a control message such as a MAC CE message comprising the value of TA3. Steps 5 825 and 6 830 may be performed continuously in a loop.

Regarding the method for the UE 850 corresponding to the method for the NT-TRP 800, in Step 1 855, the UE receives one or multiple SS/PBCH blocks. An SS/PBCH block may or may not be received with a Doppler pre-compensation. It should be noted that, even in the case that the SS/PBCH block is received with a Doppler pre-compensation, the frequency as perceived by the UE may still be shifted from a target frequency for the SS/PBCH block.

In Step 2 860, in one embodiment, the UE receives additional information, for example in one or multiple system information blocks ("SIBs"). The UE may obtain information of the SIBs from a SS/PBCH block received earlier. The broadcast information may comprise information according to a legacy terrestrial network such as information of random-access channel ("RACH") occasions. Furthermore, the broadcast information may comprise additional information specific to NTN, as mentioned above for Step 2 810 of the NT-TRP method 800.

In Step 3 865, in one embodiment, the UE transmits an initial access message such as a random-access channel ("RACH") preamble on an initial access channel such as a physical random-access channel ("PRACH").

In Step 4 870, in one embodiment, the UE receives a response to the initial access message such as a random-access response ("RAR"). The RAR may comprise a timing advance adjustment value TA2 that the UE adds to the current timing advance value in order to transmit a next uplink signal. This value of TA2 may be positive, zero, or negative.

In Step 5 875, in one embodiment, the UE transmits an uplink signal while applying a current value of timing advance.

In Step 6 880, in one embodiment, the UE receives a control message such as a MAC CE message comprising a value of TA3. The value of TA3 may be positive, zero, or negative. The UE, in one embodiment, adds the value of TA3 to the current timing advance value for transmitting a next uplink signal. Steps 5 875 and 6 880 may be performed continuously in a loop.

Figure 9:
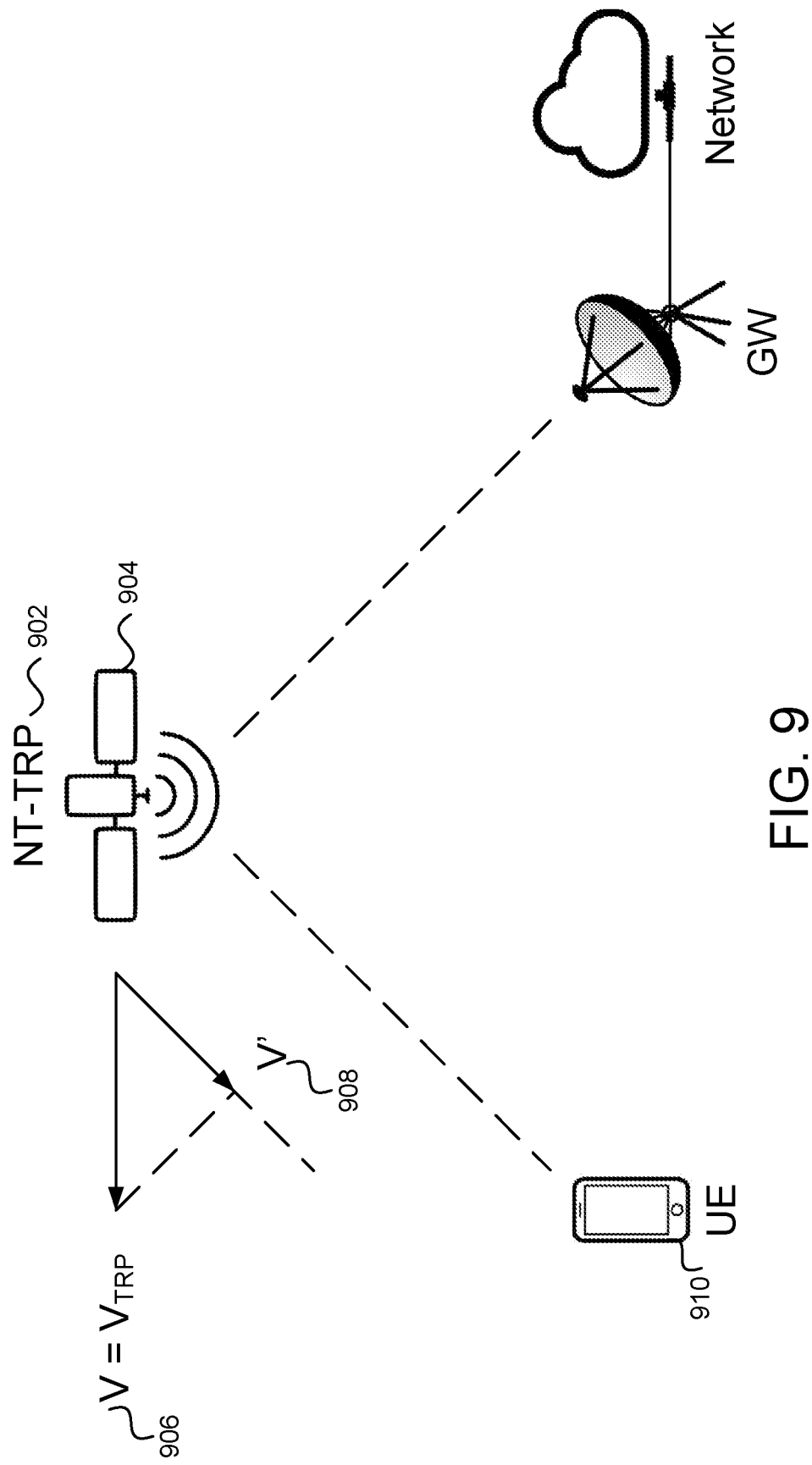
FIG. 9 depicts a diagram illustrating one embodiment of an example of an NTN with a nonzero relative velocity between an NT-TRP and a UE, according to one or more embodiments of the present disclosure.

FIG. 9 is directed to embodiments for obtaining TA drift rate from Doppler shift. In one embodiment, the NT-TRP 902 may be onboard a LEO satellite 904 traveling at a speed V 906, e.g., more than 7 km/s. Depending on the component V' 908 of V projected on the line-of-sight between the NT-TRP 902 and a UE 910, the frequency of a downlink signal from the NT-TRP 902 may be shifted by e.g., 21 to 24 ppm when received by the UE 910. The UE 910 may measure reference signals such as SS/PBCH blocks from the NT-TRP 902 frequently in order to obtain instantaneous values of Doppler shift. Since V' 908 is varying even if V 906 is constant, frequent measurements may be needed to keep an up-to-date value of the Doppler shift.

According to the following calculations, the UE 910 may use the values of Doppler shift in order to update timing advance values. Let $f_D$ denote the instantaneous frequency of a signal with frequency $f_c$ shifted due to a relative speed V'. A change $\Delta TA$ of timing advance ("TA") over a time period $\Delta t$ can be obtained as follows.

$$\frac{f_D}{f_c} = \frac{c + V'}{c} \Rightarrow V' = c\left(\frac{f_D}{f_c} - 1\right)$$

$$T_p = \frac{l}{c} \Rightarrow l = cT_p$$

$$V' = \frac{dl}{dt} = c\frac{dT_p}{dt} \Rightarrow \Delta T_p \simeq \frac{V'}{c}\Delta t$$

$$\Delta TA = 2\Delta T_p \simeq 2\frac{V'}{c}\Delta t = 2\left(\frac{f_D}{f_c} - 1\right)\Delta t$$

In the above equations, l is the instantaneous distance between the NT-TRP 902 and the UE 910, $T_p$ is the instantaneous propagation delay, and c is the speed of light. It can be seen that a change of TA can be calculated if the (target) frequency $f_c$ (e.g., carrier frequency) is known and the period since the last TA is relatively small.

In practice, a combination of TA commands, explicit indications of a TA drift, and the above calculations based on Doppler shift may be used to update TA by the UE.

In order to realize this method, a non-pre-compensated reference signal such as a SS/PBCH block should be configured for $f_D$ measurement. For beam-based methods where different reference signals may have different spatial quasi-collocation (QCL), the reference signal should be spatially quasi-collocated (QCL'ed), for example by indicating a QCL Type D, with any other signal that is used for obtaining timing information from the NT-TRP 902.

The NT-TRP 902 may apply a Doppler pre-compensation for other downlink signals. Therefore, the NT-TRP 902 may designate one or multiple reference signals such as SS/PBCH blocks for the purpose of Doppler measurements by the UE 910. An indication that a reference signal is not Doppler pre-compensated or a reference signal is designated for Doppler measurements may be communicated explicitly or implicitly to the UE 910. An explicit indication may be communicated by a configuration from the network. An implicit indication may be provided by a lack of Doppler pre-compensation configuration parameter associated with the reference signal. In either case, the UE 910 may use the reference signal to perform Doppler measurements.

An alternative to the above method is to associate a Doppler pre-compensation value with a reference signal as follows. Consider the scenario where a Doppler pre-compensation of $f_p$ is applied to a reference signal for a target frequency of $f_c$ at a UE 910. Then, when a UE 910 performs a Doppler measurement on the reference signal, it obtains a Doppler-shifted version of the Doppler pre-compensated frequency $f'_D = f_D - f_p$, where $f_D$ is the received frequency if no pre-compensation were applied. Note that $f'_D$ is supposed to be close to $f_c$, but depending on the beam-width of the satellite signal on the ground, resolution of $f_p$, and so on, the two values may be different. In this method, the value of $f_p$ may be broadcast or communicated to the UE 910. Once the UE 910 receives this value, it may calculate $f_D = f'_D + f_p$, and provided that the UE 910 knows $f_c$, it may use the above equations to update the value of TA.

In one embodiment associated with "tracking area management" for NG-RAN architecture, two types of NTN cells are defined—NTN cells that are fixed with regard to the ground and NTN cells that move with regard to the ground. When an NTN cell moves with regard to the ground, the NT-TRP 902 may fix a beam on its antenna and apply a fixed Doppler pre-compensation to a signal in a semi-static manner. In this case, the value of Doppler pre-compensation $f_p$ may be broadcast or communicated by a semi-static configuration. However, when an NTN cell is supposed to be fixed on the ground, the NT-TRP 902, for example deployed on a moving LEO satellite, may need to switch beams over time. Since the angles with regard to the ground change, a fixed Doppler pre-compensation may not work.

In this case, the instantaneous value of Doppler pre-compensation $f_p$ should be communicated to the ground. For this purpose, lower-layer signaling such as a MAC CE message may be used to communicate the value of $f_p$. Alternatively, a value of $f_p$ may be communicated with an expiration timer value. As yet another alternative, the value of $f_p$ may be associated with a QCL Type D or another parameter associated with a reference signal. In the case that a Doppler pre-compensation value for a reference signal is expired or otherwise not usable, the UE 910 may stop adjusting TA based on Doppler measurements.

In one embodiment, the foregoing methods, especially the unified method that covers different scenarios based on regenerative payload, transparent payload, access to ephemeris and/or GNSS, etc. demand unified configurations for operation. The configurations may normally be semi-static configurations by a radio resource control ("RRC") entity as well as lower layer signaling such as MAC CE messages and DCI messages. The following tables illustrate values used for a unified configuration:

TABLE 1

Configuration for TA adjustment

| Parameter | Description, values |
|---|---|
| TA granularity | |
| TA range | Depends on the satellite type/velocity |
| Reference TA | (Optional)<br>Choice {SSB/RS index, configuration of Doppler adjustment}<br>Choice {service link, feeder link, feeder + service link} |
| TA based on ephemeris/GNSS | Index/pointer to configuration of ephemeris/GNSS |
| TA drift rate | Index/pointer to [configuration of] ephemeris (velocity)<br>Choice {<br>Configuration of MAC CE message for indicating TA drift as a function of time<br>Configuration of TA drift as a function of Doppler shift<br>} |

TABLE 2

Configuration for Doppler measurement and reporting

| Parameter | Description, values |
|---|---|
| Reference signal<br>reportQuantity<br>Range<br>Granularity | Choice {SSBRI, CRI, etc.}<br>DopplerShift |

TABLE 3

Configuration for Doppler pre-compensation

| Parameter | Description, values |
|---|---|
| Doppler pre-compensation<br>Type | Choice {pre-compensation value, index to reference signal}<br>(Optional)<br>Choice {common, UE-specific} |
| Coverage | Choice {cell-based, beam-based} |
| Guard time parameters | (Optional) |

Figure 10:
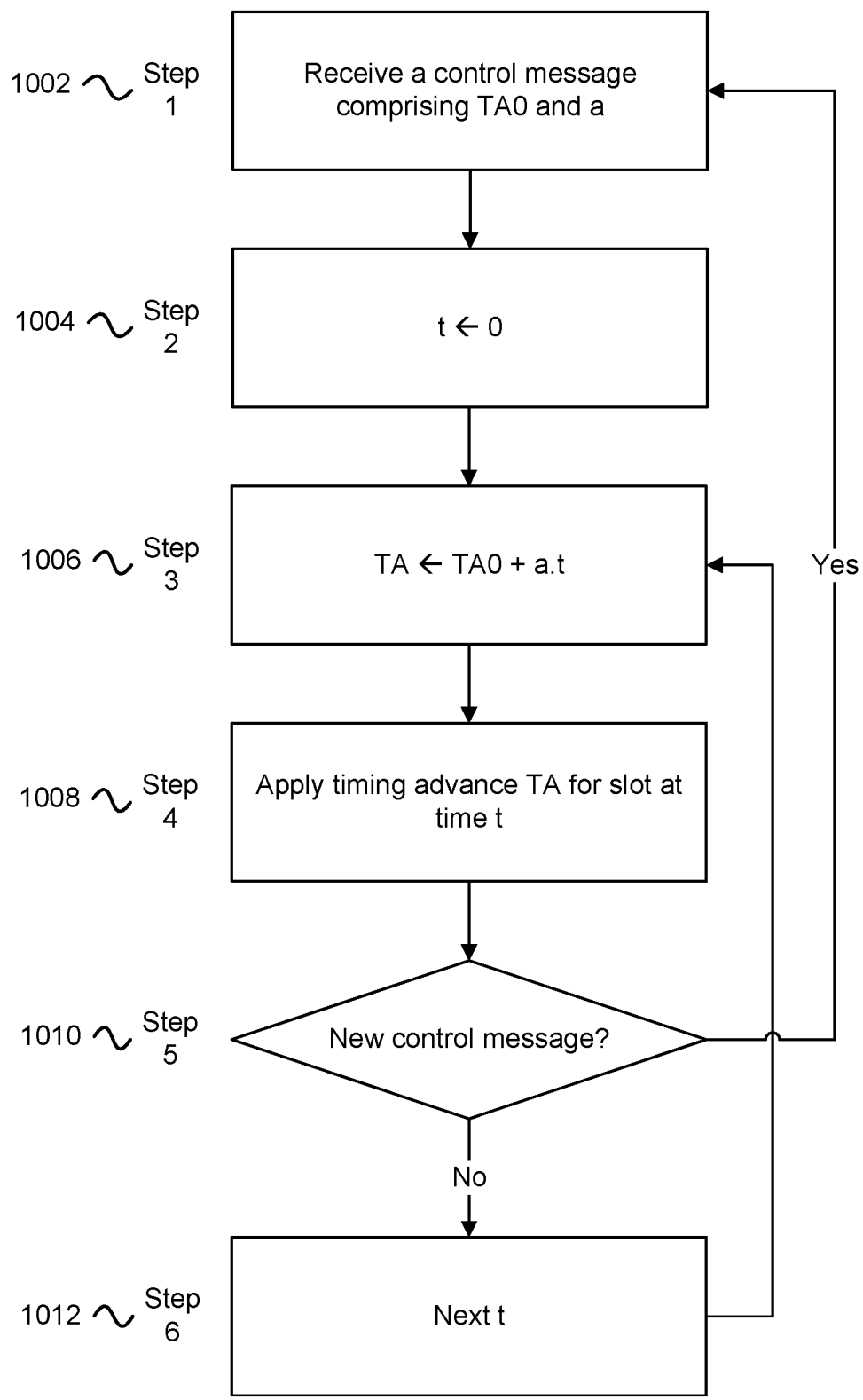
FIG. 10 depicts a diagram illustrating an example embodiment for updating TA values as a function of time, according to one or more embodiments of the present disclosure.

In one embodiment, shown in FIG. 10, another approach to TA adjustment for uplink is to minimize efforts on the UE side. In this approach, the UE behavior is largely controlled by the NT-TRP. The NT-TRP may provide a value of TA for a UE by transmitting a control message such as a MAC CE message to the UE. In the case that the TA value is contained in one control message, the method is similar to TA signaling in a legacy system except that a larger range of TA values and, hence, a new control message may be needed.

Alternatively, a TA value may be provided by transmitting a common TA value for a whole beam/cell and a differential TA value for a UE served by the beam/cell. In this case, the UE obtains a full TA value by adding the common TA value and the differential TA value.

In order to compensate for the changes of the TA from a time T1 that a control message is transmitted by the NT-TRP until a time T2 that the value is applied by the UE, the NT-TRP may need to perform calculations that predict a required TA value at T2 and indicate the TA is value in the control message that the NT-TRP transmits at T1. This process can be implemented at the NT-TRP and may be transparent to the UE.

In this approach, the frequency of transmitting control messages that provide updated TA values (e.g., full, differential, common, or a combination thereof) may depend on the relative speed of the NT-TRP and the UE. Hence, a disadvantage of this approach is that the control messages containing the updated TA values may need to be frequent, hence imposing a large signaling overhead on the downlink.

In order to reduce the frequency of TA signaling from a NT-TRP to a UE, methods can be defined for the UE to adjust the TA value for the time intervals between receiving control messages that indicate a new TA value explicitly. In this approach, a relationship can be provided between the TA value and other parameters that can be obtained by the UE.

In an embodiment, a control message such as a MAC CE message provides parameters for updating the TA value as a function of time. The function can be linear, for example, according to $TA_t = TA_0 + a \cdot t$, where:

$TA_t$ is the TA value updated for time t, where t is the time parameter in units of a number of slots, a number of frames, based on the numerology (e.g., subcarrier spacing) of the current active downlink bandwidth part or a reference numerology, and so on, starting from the time slot that the TA value is effective;

$TA_0$ is the TA value signaled by the control message to be applied for the first time slot when the control message is effective, i.e., when t=0; and the value of a is signaled by the control message.

The control message may contain an expiration time for applicability of the equation. Alternatively, or additionally, the equation to update TA values at the UE may be expired when a new control message is received that provide new values of $TA_0$ and/or a.

Calculation of these parameters can be left to implementation by the NT-TRP based on a beam angle, speed, altitude, and so on, in a way that may be fully or partially transparent to the UE.

In a more general case, parameters for a nonlinear equation such as a second-degree function of a time parameter t may be provided by a control message for a UE to update TA values before the next control message is received from the NT-TRP.

Figure 11:
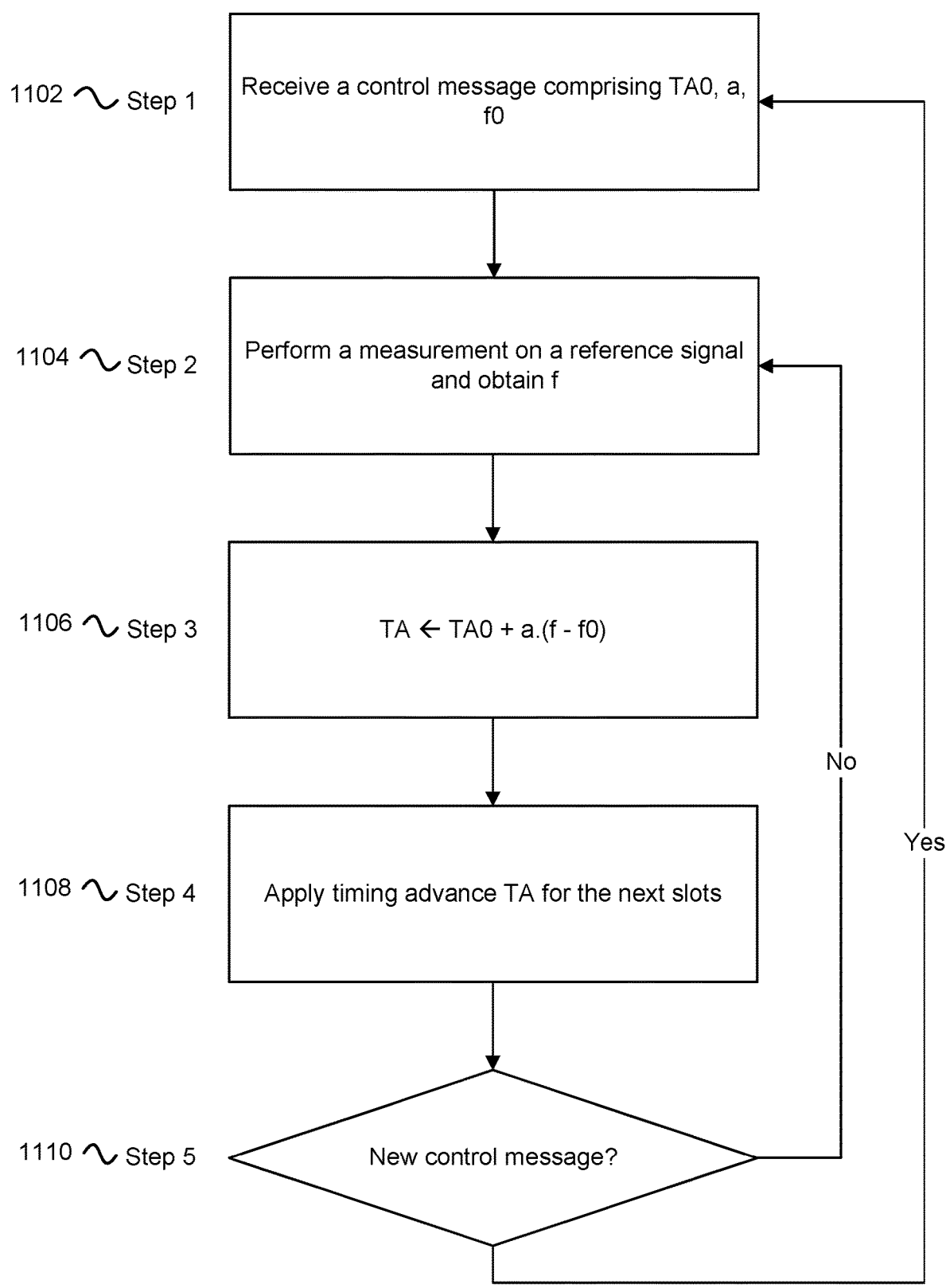
FIG. 11 depicts a diagram illustrating an example embodiment for updating TA values as a function of Doppler, according to one or more embodiments of the present disclosure.

A flowchart for an example embodiment is depicted in FIG. 11.

In Step 1 1002, the UE receives a control message comprising a value of initial timing advance (TA0) and a value of timing advance drift rate (a) as a function of time. The control message may include the values may be a MAC CE message. The unit of time may be a slot, a frame, based on the numerology (e.g., subcarrier spacing) of the current active downlink bandwidth part or a reference numerology, or any other unit determined by a specification, a configuration, a control signaling, or a like.

In Step 2 1004, the UE initializes a time parameter with a value. The value may be either zero, an offset from the time the control message in Step 1 was received, a value determined by the control message in Step 1 1002, and/or a like.

In Step 3 1006, the UE computes a value of timing advance ("TA") based on the parameters in the control message. If the initial value of the time parameter in Step 2 1004 is a nonzero value t_0, the UE may set TA←TA0+a·(t−t_0).

In Step 4 1008, the UE may apply the value of TA according to the specification, e.g., the UE may start transmitting an uplink signal by a value of TA ahead of receiving a corresponding downlink signal. Alternatively, the UE may further shift the uplink transmission by an offset as specified for NTN or signaled by a configuration or a control message.

In Step 5 1010, the UE determines whether it receives a new control message comprising values for TA drift rate parameters. If it does, the UE applies the values in the new control message for the next uplink transmission (the method returns to step 1 1002). Otherwise, the UE continues with the current values (method continues to step 6 1012).

In another embodiment, a control message such as a MAC CE message may indicate an equation for updating TA values as a function of a Doppler parameter that can be obtained by the UE by measuring a reference signal. For example, consider the case that the UE receives SS/PBCH blocks that are indicated quasi-collocated ("QCL") source reference signal. Then, by performing measurements on the SS/PBCH block, the UE can update a TA value based on the latest measured Doppler shift with respect to a reference frequency.

In some examples, shown in FIG. 11, if the received downlink timing changes and is not compensated or is only partly compensated by the uplink timing adjustment without timing advance command, the UE changes the value of the timing advance accordingly.

In Step 1 1102, the UE receives a control message comprising a value of initial timing advance (TA0), a value of timing advance drift rate (a) as a function of frequency, and a reference frequency (f0). The control message may be a MAC CE message. The unit of frequency may be determined by a specification, a configuration, a control signaling, or a like.

In Step 2 1104, the UE performs a measurement on a reference signal and obtains a frequency f associated with the reference signal. The UE may obtain information of reference signal resources according to a specification, by a configuration, or by a control signaling prior to Step 2 1104.

In Step 3 1106, the UE computes a value of timing advance ("TA") based on the parameters in the control message.

In Step 4 1108, the UE may apply the value of TA according to the specification, e.g., the UE may start transmitting an uplink signal by a value of TA ahead of receiving a corresponding downlink signal. Alternatively, the UE may further shift the uplink transmission by an offset as specified for NTN or signaled by a configuration or a control message.

In Step 5 1110, the UE determines whether it receives a new control message comprising values for TA drift rate parameters. If it does, the UE applies the values in the new control message for the next uplink transmission (returns to step 1 1102). Otherwise, the UE continues with the current values (returns to step 2 1104).

Similar to the previous embodiment, calculation of the parameters can be left to implementation by the NT-TRP based on a beam angle, speed, altitude, and so on, in a way that may be fully or partially transparent to the UE.

The value of the reference frequency $f_0$ may be signaled by the control message or by a configuration. Alternatively, the value of the reference frequency $f_0$ may be set to the frequency obtained by the latest measurement of an SS/PBCH block at the time that the control message becomes effective.

In the above method, instead of an SS/PBCH block, a reference signal such as an CSI-RS may be used for measuring a Doppler parameter.

In the case that the NT-TRP performs Doppler pre-compensation, the above method may not work properly. However, if Doppler pre-compensation is applied for a common reference point, the method may still be applicable.

In another example, a Doppler-based method is applicable if the NT-TRP applies Doppler pre-compensation for some communications such as downlink shared channels, but some reference signals such as SS/PBCH blocks are not Doppler pre-compensated.

The above method can be extended to cases that the NT-TRP indicates TA as a function of ephemeris and other parameters. In some embodiments, a combination of parameters such as time, Doppler, and ephemeris can be used to indicate a rate of TA changes.

The UE behavior in the above cases can be determined by configurations and/or standard specifications. Whether and how a method is configured for a UE may depend on UE capabilities that can be communicated to a NT-TRP or a gateway upon connecting to the network.

Methods in this disclosure may be applicable to the whole cell provided by a NT-TRP. Alternatively, the TA signaling may be beam-specific. The reason for beam-specific signaling is that propagation delays can be significantly different with respect to the cell phase accuracy determined by RAN4 for a UE.

It may be expected for a UE at the center of a serving beam to be indicated a QCL with respect to spatial Rx parameters to one reference signal at a time. However, at beam boundaries, it may be beneficial to provide timing adjustment signaling for more than a beam. In this method, TA commands and signaling may provide an indication to a SSB index or a CRI.

In one embodiment, similar to the approaches for regenerative payload, an approach from the UE's point of view for NTN based on transparent payload is to minimize the UE-side process and transmit a message comprising a TA value explicitly to each UE. This message may comprise a common TA and a UE-specific differential TA as explained for the regenerative payload scenarios. Furthermore, the TA values (particularly a full TA or a common TA) may comprise the propagation delay of the feeder link, which is normally common among all the UEs. However, in one embodiment, this approach imposes a large signaling overhead to transmit updated TA values to UEs.

In an embodiment to address this issue, an NT-TRP may broadcast a value of common TA or location (and possibly velocity) information associated with the NT-TRP and/or the gateway ("GW") in order for UEs to obtain a common value of TA or a full value of TA. Furthermore, the NT-TRP may employ one of the methods proposed in this disclosure convey a TA drift rate to the UEs. Then, further signaling from NT-TRP/gNB and/or local computation at the UE may provide a differential TA value that can be added to the common TA value (also referred to as the reference TA value).

In order to extend the proposed method to cases with transparent payload when ephemeris/GNSS is not available, the full or common TA may include the feeder link delay. Alternatively, a feeder link delay and/or a feeder link delay drift rate should be broadcast to the UE.

In several embodiments of this disclosure, a communication entity such as a gNB, a gateway ("GW"), an NT-TRP, or a UE may transmit a message comprising a value for a parameter such as a timing advance (TA), a common TA, a reference TA, a full TA, a differential TA, a TA drift rate, and so on. It is essential to note that this articulation is simplified. In practice, a parameter value is digitized and sometimes compressed for transmission of a digital message. A TA value such as the examples mentioned above may be described $TA = N_{TA} \cdot T_c \cdot X + Y$, where $N_{TA}$ is an integer value, usually with a fixed bit-width, $T_c$ is determined by the standard, and the values of X and Y are determined by a standard specification and/or a configuration or signalling. It is therefore expected, in one embodiment, that these values are understood properly by the transmitter and the receiver and, hence, the receiver can compute the value of the parameter unambiguously upon receiving the message. Furthermore, each value may be communicated in more than one parameter, possibly in more than one message.

The above principles, in one embodiment, apply to other parameters such as the satellite ephemeris, location and velocity parameters, drift parameters, and so on, where interpretation of the values, bit-widths of values, etc. are understood based on standard specification and/or configuration or signaling.

Note that the linear equation mentioned above is only one example and does not preclude nonlinear relationships between a parameter value (such as $N_{TA}$) and a value such as TA that is computed based upon it.

In one embodiment, if the UE shares an antenna and RF frontend circuitry for GNSS measurements and communication with the NT-TRP, it may not be able to perform GNSS measurements and update location/timing information in the RRC connected mode. This may be significant, for example, in the case of UE onboard an airplane with continuous connection to the NT-TRP for serving passenger devices.

In this case, a UE may be configured with measurement gaps to perform GNSS measurements in a timely manner. However, since measurement gaps for GNSS operations may not be guaranteed, a UE behavior for updating TA values may be specified by the standard and/or configured by the network.

In an embodiment, a UE is configured with measurement gaps to perform GNSS operations. Configuration of the measurement gaps may depend on the carrier frequency for the RRC connection and may depend on a UE capability. For example, if the UE indicates that it is not capable of performing simultaneous GNSS operations and communicating with a TRP, the UE may be configured with measurement gaps by the network to perform GNSS measurements. Measurement gaps may be configured by indicating a frequency of occurrence and the length of each measurement gap. These configuration parameters may also be determined based on UE capabilities signaled by the UE to the network.

If the measurement gaps are not sufficiently frequent, or if no measurement gaps for GNSS measurements are configured for the UE, the UE may employ a method for obtaining a new TA value as proposed earlier. For example, the network may configure both measurement gaps and reference signals for Doppler measurements. Then, when the UE can use a measurement gap to perform GNSS operations, it can obtain updated location/timing information and use it to compute a new TA value. However, during the time intervals between measurement gaps, the UE may perform Doppler measurements and update TA values as explained earlier. Parameters such as minimum or maximum time interval for employing a method to update a TA value without performing GNSS measurements may also be determined by a configuration or specified by the standard.

The following should be noted throughout the present disclosure:

The different steps described for the example embodiments, in the text and in the flowcharts, may be permuted.

Each configuration may be provided by one or multiple configurations in practice. An earlier configuration may provide a subset of parameters while a later configuration may provide another subset of parameters. Alternatively, a later configuration may override values provided by an earlier configuration or a pre-configuration.

A configuration may be provided by a radio resource control ("RRC") signaling, a medium-access control ("MAC") signaling, a physical layer signaling such as a downlink control information ("DCI") message, a combination thereof, or other methods. A configuration may include a pre-configuration or a semi-static configuration provided by the standard, by the vendor, and/or by the network/operator. Each parameter value received through configuration or indication may override previous values for a similar parameter.

Values of the parameters determined by standard specifications, configurations, or control signaling are in units determined by the standard specification in order to save bit-width and signaling overhead. For example, a time parameter may be described/interpreted in units of slots, frames, based on the numerology (e.g., subcarrier spacing) of the current active bandwidth part or a reference numerology, or a number of slots/frames specified by the standard or determined by a configuration. A frequency parameter may be described/interpreted in units of MHz, GHz, a number of PRBs, a fraction of the carrier frequency, or a like, as specified by the standard or determined by a configuration.

Velocity is normally determined with respect to the earth, hence an earth-fixed entity, e.g., an entity that looks fixed from the viewpoint of an observer anywhere on the earth, is normally assigned a velocity of zero, whether the entity is terrestrial (such as a VSAT antenna) or non-terrestrial (such as a GEO satellite). The velocity may be described/interpreted in units of m/s or any other velocity unit specified by the standard or configured by the network. Position and velocity values may be described in triplets in a Cartesian system such as (x, y, z), ($V_x$, $V_y$, $V_z$), or a like as specified by the standard or configured by the network.

Figure 12:
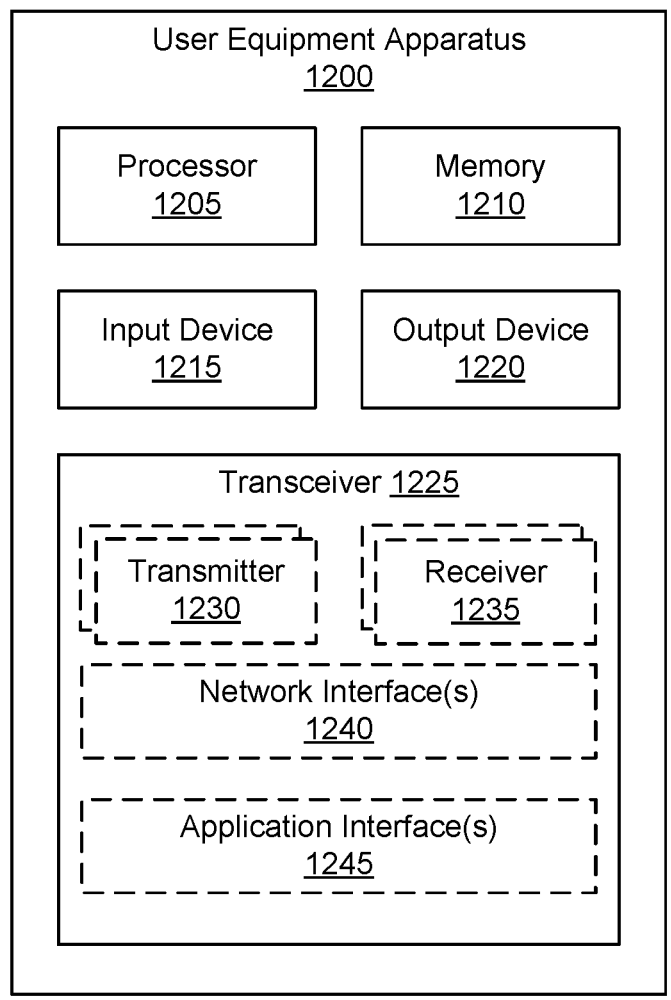
FIG. 12 is a block diagram illustrating one embodiment of a user equipment apparatus that may be used for timing and frequency adjustments in non-terrestrial networks.

FIG. 12 depicts a user equipment apparatus 1200 that may be used for timing and frequency adjustments in non-terrestrial networks, according to embodiments of the disclosure. In various embodiments, the user equipment apparatus 1200 is used to implement one or more of the solutions described above. The user equipment apparatus 1200 may be one embodiment of the remote unit 105 and/or the UE 205, described above. Furthermore, the user equipment apparatus 1200 may include a processor 1205, a memory 1210, an input device 1215, an output device 1220, and a transceiver 1225.

In some embodiments, the input device 1215 and the output device 1220 are combined into a single device, such as a touchscreen. In certain embodiments, the user equipment apparatus 1200 may not include any input device 1215 and/or output device 1220. In various embodiments, the user equipment apparatus 1200 may include one or more of: the processor 1205, the memory 1210, and the transceiver 1225, and may not include the input device 1215 and/or the output device 1220.

As depicted, the transceiver 1225 includes at least one transmitter 1230 and at least to one receiver 1235. In some embodiments, the transceiver 1225 communicates with one or more cells (or wireless coverage areas) supported by one or more base units 121. In various embodiments, the transceiver 1225 is operable on unlicensed spectrum. Moreover, the transceiver 1225 may include multiple UE panels supporting one or more beams. Additionally, the transceiver 1225 may support at least one network interface 1240 and/or application interface 1245. The application interface(s) 1245 may support one or more APIs. The network interface(s) 1240 may support 3GPP reference points, such as Uu, N1, PC5, etc. Other network interfaces 1240 may be supported, as understood by one of ordinary skill in the art.

The processor 1205, in one embodiment, may include any known controller capable of executing computer-readable instructions and/or capable of performing logical operations. For example, the processor 1205 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1205 executes instructions stored in the memory 1210 to perform the methods and routines described herein. The processor 1205 is communicatively coupled to the memory 1210, the input device 1215, the output device 1220, and the transceiver 1225.

In various embodiments, the processor 1205 controls the user equipment apparatus 1200 to implement the above described UE behaviors. In certain embodiments, the processor 1205 may include an application processor (also known as "main processor") which manages application-domain and operating system ("OS") functions and a baseband processor (also known as "baseband radio processor") which manages radio functions.

In one embodiment, the processor 1205 determines a first frequency from one of a first reference signal received from a mobile wireless communication network and a configuration message received from the mobile wireless communication network. In one embodiment, the processor 1205 determines a second frequency from a second reference signal received from the mobile wireless communication network. In one embodiment, the processor 1205 computes a second timing advance value based on a first timing advance value, the first determined frequency, and the second determined frequency, the first timing advance value received as part of a control message. In one embodiment, the transceiver 1225 transmits, to the mobile wireless communication network, an uplink signal using the second timing advance value.

In one embodiment, the transceiver 1225 receives an indication that the second reference signal is not altered for a Doppler pre-compensation, the Doppler pre-compensation comprising a frequency shift in a transmitter.

In one embodiment, the processor 1205 computes the second timing advance value by computing a ratio of the second determined frequency to the first determined frequency. In one embodiment, the processor 1205 computes the second timing advance value by computing a difference between a first time and a second time, the first time associated with a time when the first timing advance value is received, and the second time associated with a time when the uplink signal is transmitted.

In one embodiment, the processor 1205 computes the second timing advance value as a function of the first timing advance value plus a delta timing advance value, wherein the delta timing advance value is equal to two times a coefficient times a time difference value, the coefficient comprises a ratio of the second frequency to the first frequency minus one, the time difference value comprises a difference between a first time and a second time, the first time is associated with a time when the first timing advance value is received, and the second time is associated with a time when the uplink signal is transmitted.

In one embodiment, the processor 1205 computes the second time advance value according to a pre-defined time function that considers the first timing advance value, the first determined frequency, and the second determined frequency.

In one embodiment, the control message further comprises an expiration timer value such that transmitting the uplink signal using the second timing advance value is performed in response to determining that a first time associated with a time when the control message is received plus the expiration timer value is larger than a second time associated with a time when the uplink signal is transmitted.

In one embodiment, the transceiver 1225 transmits the uplink signal using the second timing advance value in response to receiving at least one of an indication of a quasi-collocation relationship between the first reference signal and the second reference signal, an indication of a quasi-collocation relationship between the first reference signal and the first timing advance value, and an indication of a quasi-collocation relationship between the second reference signal and the first timing advance value.

In one embodiment, the first reference signal comprises a first synchronization signal and the second reference signal comprises a second synchronization signal. In one embodiment, the first frequency comprises at least one of a carrier frequency, a carrier frequency without a Doppler pre-compensation, a carrier frequency with a Doppler pre-compensation, and a Doppler pre-compensation frequency.

In one embodiment, at least a portion of the mobile wireless communication network comprises a non-terrestrial network that provides a wireless connection between the UE and a gateway of a terrestrial network.

The memory 1210, in one embodiment, is a computer readable storage medium. In some embodiments, the memory 1210 includes volatile computer storage media. For example, the memory 1210 may include a RAM, including dynamic RAM ("DRAM"), synchronous dynamic RAM ("SDRAM"), and/or static RAM ("SRAM"). In some embodiments, the memory 1210 includes non-volatile computer storage media. For example, the memory 1210 may include a hard disk drive, a flash memory, or any other suitable non-volatile computer storage device. In some embodiments, the memory 1210 includes both volatile and non-volatile computer storage media.

In some embodiments, the memory 1210 stores data related to timing and frequency adjustments in non-terrestrial networks. For example, the memory 1210 may store various parameters, panel/beam configurations, resource assignments, policies, and the like as described above. In certain embodiments, the memory 1210 also stores program code and related data, such as an operating system or other controller algorithms operating on the apparatus 1200.

The input device 1215, in one embodiment, may include any known computer input device including a touch panel, a button, a keyboard, a stylus, a microphone, or the like. In some embodiments, the input device 1215 may be integrated with the output device 1220, for example, as a touchscreen or similar touch-sensitive display. In some embodiments, the input device 1215 includes a touchscreen such that text may be input using a virtual keyboard displayed on the touchscreen and/or by handwriting on the touchscreen. In some embodiments, the input device 1215 includes two or more different devices, such as a keyboard and a touch panel.

The output device 1220, in one embodiment, is designed to output visual, audible, and/or haptic signals. In some embodiments, the output device 1220 includes an electronically controllable display or display device capable of outputting visual data to a user. For example, the output device 1220 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 1220 may include a wearable display separate from, but communicatively coupled to, the rest of the user equipment apparatus 1200, such as a smart watch, smart glasses, a heads-up display, or the like. Further, the output device 1220 may be a component of a smart phone, a personal digital assistant, a television, a table computer, a notebook (laptop) computer, a personal computer, a vehicle dashboard, or the like.

In certain embodiments, the output device 1220 includes one or more speakers for producing sound. For example, the output device 1220 may produce an audible alert or notification (e.g., a beep or chime). In some embodiments, the output device 1220 includes one or more haptic devices for producing vibrations, motion, or other haptic feedback. In some embodiments, all, or portions of the output device 1220 may be integrated with the input device 1215. For example, the input device 1215 and output device 1220 may form a touchscreen or similar touch-sensitive display. In other embodiments, the output device 1220 may be located near the input device 1215.

The transceiver 1225 communicates with one or more network functions of a mobile communication network via one or more access networks. The transceiver 1225 operates under the control of the processor 1205 to transmit messages, data, and other signals and also to receive messages, data, and other signals. For example, the processor 1205 may selectively activate the transceiver 1225 (or portions thereof) at particular times in order to send and receive messages.

The transceiver 1225 includes at least transmitter 1230 and at least one receiver 1235. One or more transmitters 1230 may be used to provide UL communication signals to a base unit 121, such as the UL transmissions described herein. Similarly, one or more receivers 1235 may be used to receive DL communication signals from the base unit 121, as described herein. Although only one transmitter 1230 and one receiver 1235 are illustrated, the user equipment apparatus 1200 may have any suitable number of transmitters 1230 and receivers 1235. Further, the transmitter(s) 1230 and the receiver(s) 1235 may be any suitable type of transmitters and receivers. In one embodiment, the transceiver 1225 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1225, transmitters 1230, and receivers 1235 may be implemented as physically separate components that access a shared hardware resource and/or software resource, such as for example, the network interface 1240.

In various embodiments, one or more transmitters 1230 and/or one or more receivers 1235 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 1230 and/or one or more receivers 1235 may be implemented and/or integrated into a multi-chip module. In some embodiments, other components such as the network interface 1240 or other hardware components/circuits may be integrated with any number of transmitters 1230 and/or receivers 1235 into a single chip. In such embodiment, the transmitters 1230 and receivers 1235 may be logically configured as a transceiver 1225 that uses one more common control signals or as modular transmitters 1230 and receivers 1235 implemented in the same hardware chip or in a multi-chip module.

Figure 13:
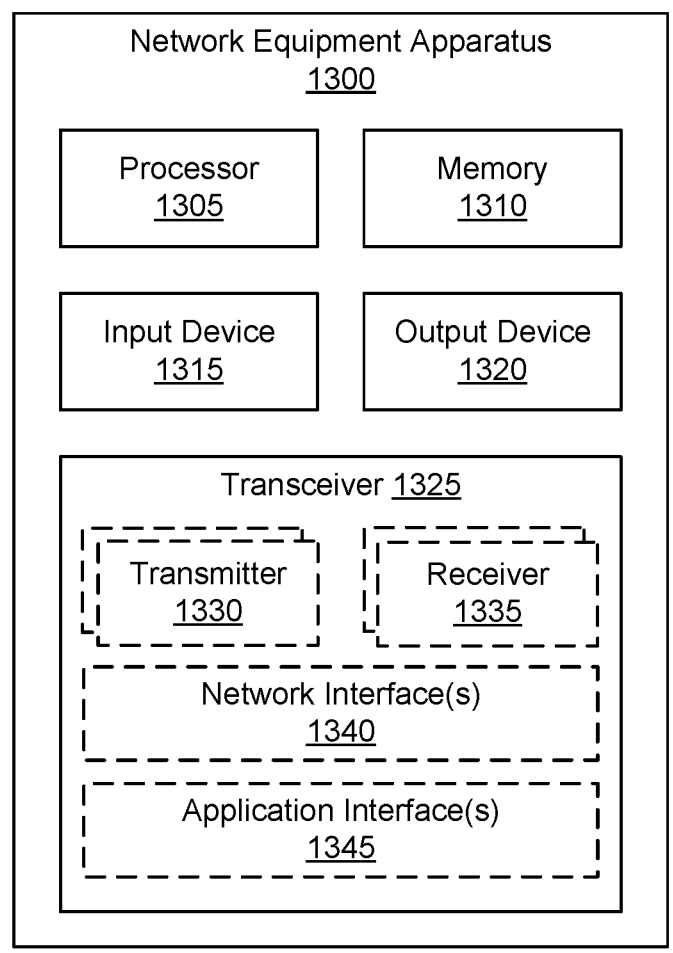
FIG. 13 is a block diagram illustrating one embodiment of a network equipment apparatus that may be used for timing and frequency adjustments in non-terrestrial networks.

FIG. 13 depicts a network equipment apparatus 1300 that may be used for timing and frequency adjustments in non-terrestrial networks, according to embodiments of the disclosure. In one embodiment, network apparatus 1300 may be one implementation of a RAN node, such as the base unit 121 and/or the RAN node 210, as described above. Furthermore, the base network apparatus 1300 may include a processor 1305, a memory 1310, an input device 1315, an output device 1320, and a transceiver 1325.

In some embodiments, the input device 1315 and the output device 1320 are combined into a single device, such as a touchscreen. In certain embodiments, the network apparatus 1300 may not include any input device 1315 and/or output device 1320. In various embodiments, the network apparatus 1300 may include one or more of: the processor 1305, the memory 1310, and the transceiver 1325, and may not include the input device 1315 and/or the output device 1320.

As depicted, the transceiver 1325 includes at least one transmitter 1330 and at least one receiver 1335. Here, the transceiver 1325 communicates with one or more remote units 175. Additionally, the transceiver 1325 may support at least one network interface 1340 and/or application interface 1345. The application interface(s) 1345 may support one or more APIs. The network interface(s) 1340 may support 3GPP reference points, such as Uu, N1, N2 and N3. Other network interfaces 1340 may be supported, as understood by one of ordinary skill in the art.

The processor 1305, in one embodiment, may include any known controller capable of executing computer-readable instructions and/or capable of performing logical operations. For example, the processor 1305 may be a microcontroller, a microprocessor, a CPU, a GPU, an auxiliary processing unit, a FPGA, or similar programmable controller. In some embodiments, the processor 1305 executes instructions stored in the memory 1310 to perform the methods and routines described herein. The processor 1305 is communicatively coupled to the memory 1310, the input device 1315, the output device 1320, and the transceiver 1325.

In various embodiments, the network apparatus 1300 is a RAN node (e.g., gNB) that communicates with one or more UEs, as described herein. In such embodiments, the processor 1305 controls the network apparatus 1300 to perform the above described RAN behaviors. When operating as a RAN node, the processor 1305 may include an application processor (also known as "main processor") which manages application-domain and operating system ("OS") functions and a baseband processor (also known as "baseband radio processor") which manages radio functions.

In various embodiments, the processor 1305 and transceiver 1325 control the network apparatus 1300 to perform the above described embodiments. For example, in one embodiment, the transceiver 1325 transmits, to a User Equipment ("UE") device, one of a first reference signal and a configuration message, transmits, to the UE device, a second reference signal, transmits, to the UE device, a control message comprising a first timing advance value, and receives, from the UE device, an uplink signal that is transmitted using a second timing advance value, the second timing advance value determined based on a first frequency determined from one of the first reference signal and the configuration message, a second frequency determined from the second reference signal, and the first timing advance value.

The memory 1310, in one embodiment, is a computer readable storage medium. In some embodiments, the memory 1310 includes volatile computer storage media. For example, the memory 1310 may include a RAM, including dynamic RAM ("DRAM"), synchronous dynamic RAM ("SDRAM"), and/or static RAM ("SRAM"). In some embodiments, the memory 1310 includes non-volatile computer storage media. For example, the memory 1310 may include a hard disk drive, a flash memory, or any other suitable non-volatile computer storage device. In some embodiments, the memory 1310 includes both volatile and non-volatile computer storage media.

In some embodiments, the memory 1310 stores data related to timing and frequency adjustments in non-terrestrial networks. For example, the memory 1310 may store parameters, configurations, resource assignments, policies, and the like, as described above. In certain embodiments, the memory 1310 also stores program code and related data, such as an operating system or other controller algorithms operating on the apparatus 1300.

The input device 1315, in one embodiment, may include any known computer input device including a touch panel, a button, a keyboard, a stylus, a microphone, or the like. In some embodiments, the input device 1315 may be integrated with the output device 1320, for example, as a touchscreen or similar touch-sensitive display. In some embodiments, the input device 1315 includes a touchscreen such that text may be input using a virtual keyboard displayed on the touchscreen and/or by handwriting on the touchscreen. In some embodiments, the input device 1315 includes two or more different devices, such as a keyboard and a touch panel.

The output device 1320, in one embodiment, is designed to output visual, audible, and/or haptic signals. In some embodiments, the output device 1320 includes an electronically controllable display or display device capable of outputting visual data to a user. For example, the output device 1320 may include, but is not limited to, an LCD display, an LED display, an OLED display, a projector, or similar display device capable of outputting images, text, or the like to a user. As another, non-limiting, example, the output device 1320 may include a wearable display separate from, but communicatively coupled to, the rest of the network apparatus 1300, such as a smart watch, smart glasses, a heads-up display, or the like. Further, the output device 1320 may be a component of a smart phone, a personal digital assistant, a television, a table computer, a notebook (laptop) computer, a personal computer, a vehicle dashboard, or the like.

In certain embodiments, the output device 1320 includes one or more speakers for producing sound. For example, the output device 1320 may produce an audible alert or notification (e.g., a beep or chime). In some embodiments, the output device 1320 includes one or more haptic devices for producing vibrations, motion, or other haptic feedback. In some embodiments, all, or portions of the output device 1320 may be integrated with the input device 1315. For example, the input device 1315 and output device 1320 may form a touchscreen or similar touch-sensitive display. In other embodiments, the output device 1320 may be located near the input device 1315.

The transceiver 1325 includes at least transmitter 1330 and at least one receiver 1335. One or more transmitters 1330 may be used to communicate with the UE, as described herein. Similarly, one or more receivers 1335 may be used to communicate with network functions in the PLMN and/or RAN, as described herein. Although only one transmitter 1330 and one receiver 1335 are illustrated, the network apparatus 1300 may have any suitable number of transmitters 1330 and receivers 1335. Further, the transmitter(s) 1330 and the receiver(s) 1335 may be any suitable type of transmitters and receivers.

Figure 14:
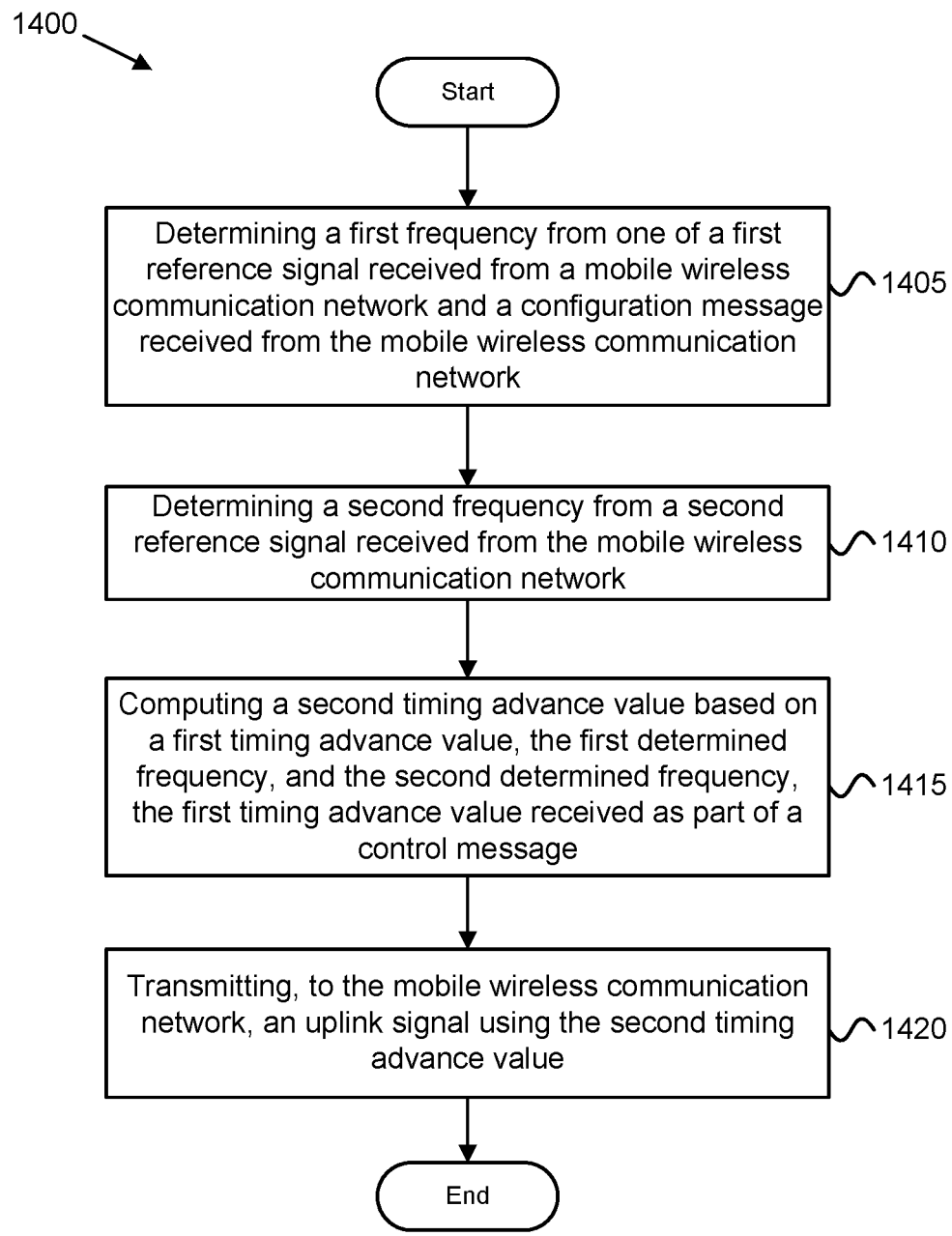
FIG. 14 is a block diagram illustrating one embodiment of a first method for timing and frequency adjustments in non-terrestrial networks.

FIG. 14 depicts one embodiment of a method 1400 for timing and frequency adjustments in non-terrestrial networks, according to embodiments of the disclosure. In various embodiments, the method 1400 is performed by a user equipment device in a mobile communication network, such as the remote unit 105, the UE 205, and/or the user equipment apparatus 1200, described above. In some embodiments, the method 1400 is performed by a processor, such as a microcontroller, a microprocessor, a CPU, a GPU, an auxiliary processing unit, a FPGA, or the like.

In one embodiment, the method 1400 begins and determines 1405 a first frequency from one of a first reference signal received from a mobile wireless communication network and a configuration message received from the mobile wireless communication network. In one embodiment, the method 1400 determines 1410 a second frequency from a second reference signal received from the mobile wireless communication network.

In one embodiment, the method 1400 computes 1415 a second timing advance value based on a first timing advance value, the first determined frequency, and the second determined frequency, the first timing advance value received as part of a control message. In one embodiment, the method 1400 transmits 1420, to the mobile wireless communication network, an uplink signal using the second timing advance value, and the method 1400 ends.

Figure 15:
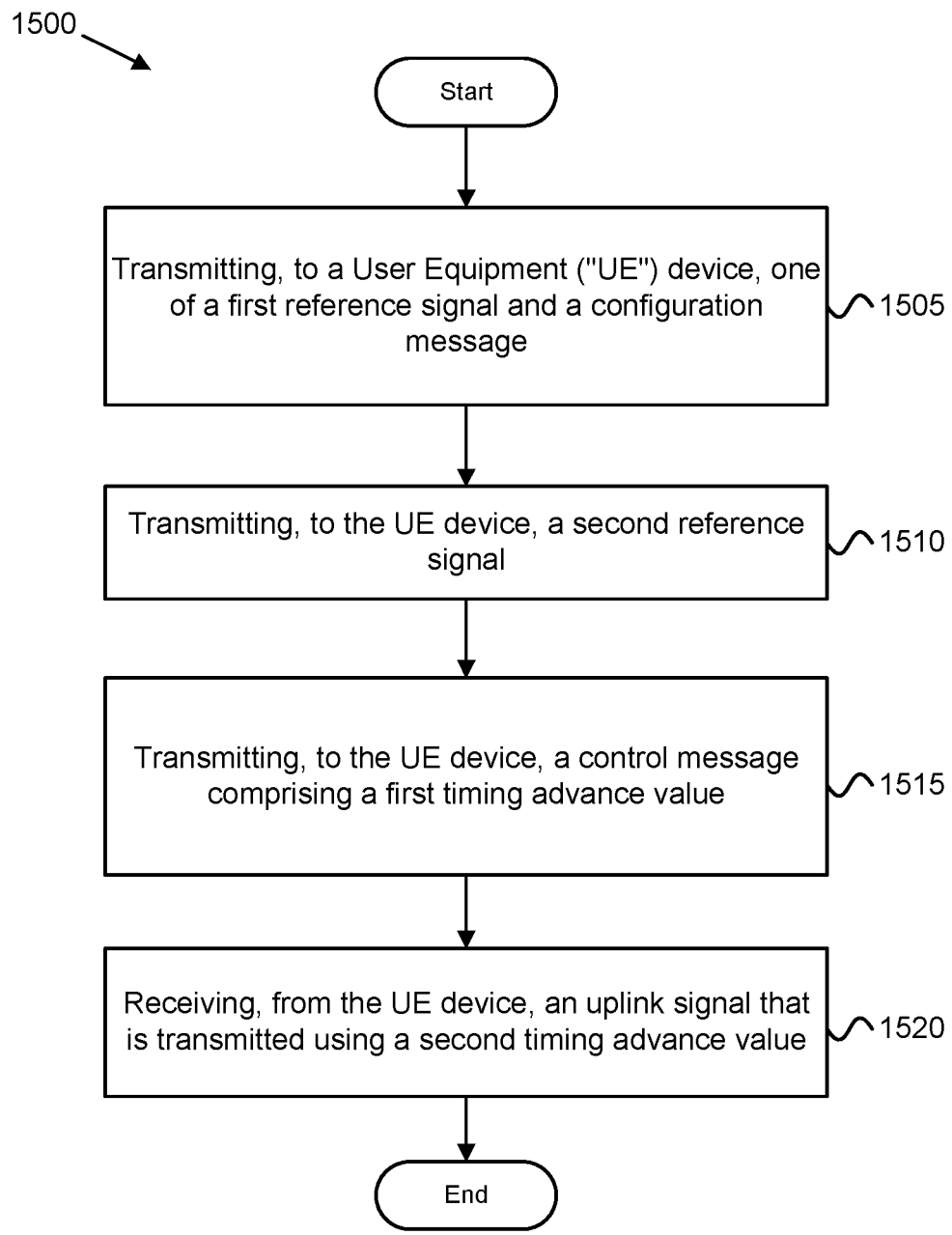
FIG. 15 is a block diagram illustrating one embodiment of a second method for timing and frequency adjustments in non-terrestrial networks.

FIG. 15 depicts one embodiment of a method 1500 for timing and frequency adjustments in non-terrestrial networks, according to embodiments of the disclosure. In various embodiments, the method 1500 is performed by a network apparatus 1300, described above. In some embodiments, the method 1500 is performed by a processor, such as a microcontroller, a microprocessor, a CPU, a GPU, an auxiliary processing unit, a FPGA, or the like.

The method 1500 begins and transmits 1505, to a User Equipment ("UE") device, one of a first reference signal and a configuration message. In one embodiment, the method 1500 transmits 1510, to the UE device, a second reference signal. In one embodiment, the method 1500 transmits 1515, to the UE device, a control message comprising a first timing advance value. In one embodiment, the method 1500 receives 1520, from the UE device, an uplink signal that is transmitted using a second timing advance value, and the method 1500 ends.

Disclosed herein is a first apparatus for timing and frequency adjustments in non-terrestrial networks, according to embodiments of the disclosure. The first apparatus may be implemented by a user equipment device in a mobile communication network, such as the remote unit 105, the UE 205, and/or the user equipment apparatus 1200, described above.

In one embodiment, the first apparatus includes a processor that determines a first frequency from one of a first reference signal received from a mobile wireless communication network and a configuration message received from the mobile wireless communication network. In one embodiment, the processor determines a second frequency from a second reference signal received from the mobile wireless communication network. In one embodiment, the processor computes a second timing advance value based on a first timing advance value, the first determined frequency, and the second determined frequency, the first timing advance value received as part of a control message. In one embodiment, the first apparatus includes a transceiver that transmits, to the mobile wireless communication network, an uplink signal using the second timing advance value.

In one embodiment, the transceiver receives an indication that the second reference signal is not altered for a Doppler pre-compensation, the Doppler pre-compensation comprising a frequency shift in a transmitter.

In one embodiment, the processor computes the second timing advance value by computing a ratio of the second determined frequency to the first determined frequency. In one embodiment, the processor computes the second timing advance value by computing a difference between a first time and a second time, the first time associated with a time when the first timing advance value is received, and the second time associated with a time when the uplink signal is transmitted.

In one embodiment, the processor computes the second timing advance value as a function of the first timing advance value plus a delta timing advance value, wherein the delta timing advance value is equal to two times a coefficient times a time difference value, the coefficient comprises a ratio of the second frequency to the first frequency minus one, the time difference value comprises a difference between a first time and a second time, the first time is associated with a time when the first timing advance value is received, and the second time is associated with a time when the uplink signal is transmitted.

In one embodiment, the processor computes the second time advance value according to a pre-defined time function that considers the first timing advance value, the first determined frequency, and the second determined frequency.

In one embodiment, the control message further comprises an expiration timer value such that transmitting the uplink signal using the second timing advance value is performed in response to determining that a first time associated with a time when the control message is received plus the expiration timer value is larger than a second time associated with a time when the uplink signal is transmitted.

In one embodiment, the transceiver transmits the uplink signal using the second timing advance value in response to receiving at least one of an indication of a quasi-collocation relationship between the first reference signal and the second reference signal, an indication of a quasi-collocation relationship between the first reference signal and the first timing advance value, and an indication of a quasi-collocation relationship between the second reference signal and the first timing advance value.

In one embodiment, the first reference signal comprises a first synchronization signal and the second reference signal comprises a second synchronization signal. In one embodiment, the first frequency comprises at least one of a carrier frequency, a carrier frequency without a Doppler pre-compensation, a carrier frequency with a Doppler pre-compensation, and a Doppler pre-compensation frequency.

In one embodiment, at least a portion of the mobile wireless communication network comprises a non-terrestrial network that provides a wireless connection between the UE and a gateway of a terrestrial network.

Disclosed herein is a first method for timing and frequency adjustments in non-terrestrial networks, according to embodiments of the disclosure. The first method may be performed by a user equipment device in a mobile communication network, such as the remote unit 105, the UE 205, and/or the user equipment apparatus 1000, described above.

In one embodiment, the first method includes determining a first frequency from one of a first reference signal received from a mobile wireless communication network and a configuration message received from the mobile wireless communication network. In one embodiment, the method includes determining a second frequency from a second reference signal received from the mobile wireless communication network. In one embodiment, the method includes computing a second timing advance value based on a first timing advance value, the first determined frequency, and the second determined frequency, the first timing advance value received as part of a control message. In one embodiment, the method includes transmitting, to the mobile wireless communication network, an uplink signal using the second timing advance value.

In one embodiment, the first method receives an indication that the second reference signal is not altered for a Doppler pre-compensation, the Doppler pre-compensation comprising a frequency shift in a transmitter.

In one embodiment, the first method computes the second timing advance value by computing a ratio of the second determined frequency to the first determined frequency. In one embodiment, the first method computes the second timing advance value by computing a difference between a first time and a second time, the first time associated with a time when the first timing advance value is received, and the second time associated with a time when the uplink signal is transmitted.

In one embodiment, the first method computes the second timing advance value as a function of the first timing advance value plus a delta timing advance value, wherein the delta timing advance value is equal to two times a coefficient times a time difference value, the coefficient comprises a ratio of the second frequency to the first frequency minus one, the time difference value comprises a difference between a first time and a second time, the first time is associated with a time when the first timing advance value is received, and the second time is associated with a time when the uplink signal is transmitted.

In one embodiment, the first method computes the second time advance value according to a pre-defined time function that considers the first timing advance value, the first determined frequency, and the second determined frequency.

In one embodiment, the control message further comprises an expiration timer value such that transmitting the uplink signal using the second timing advance value is performed in response to determining that a first time associated with a time when the control message is received plus the expiration timer value is larger than a second time associated with a time when the uplink signal is transmitted.

In one embodiment, the first method transmits the uplink signal using the second timing advance value in response to receiving at least one of an indication of a quasi-collocation relationship between the first reference signal and the second reference signal, an indication of a quasi-collocation relationship between the first reference signal and the first timing advance value, and an indication of a quasi-collocation relationship between the second reference signal and the first timing advance value.

In one embodiment, the first reference signal comprises a first synchronization signal and the second reference signal comprises a second synchronization signal. In one embodiment, the first frequency comprises at least one of a carrier frequency, a carrier frequency without a Doppler pre-compensation, a carrier frequency with a Doppler pre-compensation, and a Doppler pre-compensation frequency.

In one embodiment, at least a portion of the mobile wireless communication network comprises a non-terrestrial network that provides a wireless connection between the UE and a gateway of a terrestrial network.

Disclosed herein is a second apparatus for timing and frequency adjustments in non-terrestrial networks, according to embodiments of the disclosure. The second apparatus may be implemented by a base station, e.g., a gNB and/or the network apparatus 1300, described above.

In one embodiment, the second apparatus includes a transceiver that transmits, to a User Equipment ("UE") device, one of a first reference signal and a configuration message, transmits, to the UE device, a second reference signal, transmits, to the UE device, a control message comprising a first timing advance value, and receives, from the UE device, an uplink signal that is transmitted using a second timing advance value, the second timing advance value determined based on a first frequency determined from one of the first reference signal and the configuration message, a second frequency determined from the second reference signal, and the first timing advance value.

Disclosed herein is a second method for timing and frequency adjustments in non-terrestrial networks, according to embodiments of the disclosure. The second method may be performed by a base station, e.g., a gNB and/or the network apparatus 1300, described above.

In one embodiment, the second method includes transmitting, to a User Equipment ("UE") device, one of a first reference signal and a configuration message, transmitting, to the UE device, a second reference signal, transmitting, to the UE device, a control message comprising a first timing advance value, and receiving, from the UE device, an uplink signal that is transmitted using a second timing advance value, the second timing advance value determined based on a first frequency determined from one of the first reference signal and the configuration message, a second frequency determined from the second reference signal, and the first timing advance value.

In the foregoing, several acronyms and mathematical notations are used. A brief explanation of some is provided below:

Quantities:
   i. G—ephemeris information or location information
   ii. L—location, for example, 3D coordinates
   iii. P—position, for example, 3D coordinates
   iv. V—velocity, for example:
      1. speed in 3D coordinates, or
      2. heading direction plus speed (magnitude of velocity)
   v. T—time or time stamp or time reference associated with
   vi. TA—timing advance Subscripts:
   i. NW—network
   ii. UE—user equipment (normally on the ground, but could be non-terrestrial too for the sake of generality)
   iii. GW—gateway (normally on the ground)
   iv. TRP—NT-TRP (or ground TRP for the sake of generality)

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
   at least one memory; and
   at least one processor coupled with the at least one memory and configured to cause the UE to:
      determine a first frequency from one of a first reference signal received from a mobile wireless communication network and a configuration message received from the mobile wireless communication network;
      determine a second frequency from a second reference signal received from the mobile wireless communication network;
      compute a second timing advance value based on a first timing advance value, the first determined frequency, and the second determined frequency, the first timing advance value received as part of a control message, wherein computing the second timing advance value comprises computing a difference between a first time and a second time, the first time associated with a time when the first timing advance value is received, and the second time associated with a time when an uplink signal is transmitted; and
      transmit, to the mobile wireless communication network, an uplink signal using the second timing advance value.

2. The UE of claim 1, wherein the at least one processor is configured to cause the UE to receive an indication that the second reference signal is not altered for a Doppler pre-compensation, the Doppler pre-compensation comprising a frequency shift in a transmitter.

3. The UE of claim 1, wherein the at least one processor is configured to cause the UE to compute the second timing advance value by computing a ratio of the second determined frequency to the first determined frequency.

4. The UE of claim 1, wherein the at least one processor is configured to cause the UE to compute the second timing advance value as a function of the first timing advance value plus a delta timing advance value, wherein:
   the delta timing advance value is equal to two times a coefficient times a time difference value;
   the coefficient comprises a ratio of the second frequency to the first frequency minus one;
   the time difference value comprises a difference between a first time and a second time;
   the first time is associated with a time when the first timing advance value is received; and
   the second time is associated with a time when the uplink signal is transmitted.

5. The UE of claim 1, wherein the at least one processor is configured to cause the UE to cause the UE to compute the second time advance value according to a pre-defined time function that considers the first timing advance value, the first determined frequency, and the second determined frequency.

6. The UE of claim 1, wherein the control message further comprises an expiration timer value such that transmitting the uplink signal using the second timing advance value is performed in response to determining that a first time associated with a time when the control message is received plus the expiration timer value is larger than a second time associated with a time when the uplink signal is transmitted.

7. The UE of claim 6, wherein the at least one processor is configured to cause the UE to transmit the uplink signal using the second timing advance value in response to receiving at least one of:
   an indication of a quasi-collocation relationship between the first reference signal and the second reference signal;
   an indication of a quasi-collocation relationship between the first reference signal and the first timing advance value; and
   an indication of a quasi-collocation relationship between the second reference signal and the first timing advance value.

8. The UE of claim 1, wherein the first reference signal comprises a first synchronization signal and the second reference signal comprises a second synchronization signal.

9. The UE of claim 1, wherein the first frequency comprises at least one of a carrier frequency, a carrier frequency without a Doppler pre-compensation, a carrier frequency with a Doppler pre-compensation, and a Doppler pre-compensation frequency.

10. The UE of claim 1, wherein at least a portion of the mobile wireless communication network comprises a non-terrestrial network that provides a wireless connection between a user equipment ("UE") and a gateway of a terrestrial network.

11. A method performed by a user equipment (UE), the method comprising:
   determining a first frequency from one of a first reference signal received from a mobile wireless communication network and a configuration message received from the mobile wireless communication network;
   determining a second frequency from a second reference signal received from the mobile wireless communication network;
   computing a second timing advance value based on a first timing advance value, the first determined frequency, and the second determined frequency, the first timing advance value received as part of a control message, wherein computing the second timing advance value comprises computing a difference between a first time and a second time, the first time associated with a time when the first timing advance value is received, and the second time associated with a time when an uplink signal is transmitted; and
   transmitting, to the mobile wireless communication network, an uplink signal using the second timing advance value.

12. The method of claim 11, further comprising receiving an indication that the second reference signal is not altered for a Doppler pre-compensation, the Doppler pre-compensation comprising a frequency shift in a transmitter.

13. The method of claim 11, further comprising computing the second timing advance value by computing a ratio of the second determined frequency to the first determined frequency.

14. The method of claim 11, further comprising computing the second timing advance value as a function of the first timing advance value plus a delta timing advance value, wherein:
   the delta timing advance value is equal to two times a coefficient times a time difference value;
   the coefficient comprises a ratio of the second frequency to the first frequency minus one;
   the time difference value comprises a difference between a first time and a second time;
   the first time is associated with a time when the first timing advance value is received; and
   the second time is associated with a time when the uplink signal is transmitted.

15. The method of claim 11, further comprising computing the second time advance value according to a predefined time function that considers the first timing advance value, the first determined frequency, and the second determined frequency.

16. The method of claim 11, wherein the control message further comprises an expiration timer value such that transmitting the uplink signal using the second timing advance value is performed in response to determining that a first time associated with a time when the control message is received plus the expiration timer value is larger than a second time associated with a time when the uplink signal is transmitted.

17. The method of claim 16, further comprising transmitting the uplink signal using the second timing advance value in response to receiving at least one of:
   an indication of a quasi-collocation relationship between the first reference signal and the second reference signal;
   an indication of a quasi-collocation relationship between the first reference signal and the first timing advance value; and
   an indication of a quasi-collocation relationship between the second reference signal and the first timing advance value.

18. A base station, comprising:
   at least one memory; and
   at least one processor coupled with the at least one memory and configured to cause the base station to:
     transmit, to a user equipment ("UE") device, one of a first reference signal and a configuration message;
     transmit, to the UE device, a second reference signal;
     transmit, to the UE device, a control message comprising a first timing advance value; and
     receive, from the UE device, an uplink signal that is transmitted using a second timing advance value, the second timing advance value determined based on:
       a first frequency determined from one of the first reference signal and the configuration message;
       a second frequency determined from the second reference signal; and
       the first timing advance value, wherein the second timing advance value comprises a difference between a first time and a second time, the first time associated with a time when a first timing advance value is transmitted, and the second time associated with a time when an uplink signal is received.

19. A processor for wireless communication, comprising:
   at least one controller coupled with at least one memory and configured to cause the processor to:
     determine a first frequency from one of a first reference signal received from a mobile wireless communication network and a configuration message received from the mobile wireless communication network;
     determine a second frequency from a second reference signal received from the mobile wireless communication network;

compute a second timing advance value based on a first timing advance value, the first determined frequency, and the second determined frequency, the first timing advance value received as part of a control message, wherein computing the second timing advance value comprises computing a difference between a first time and a second time, the first time associated with a time when the first timing advance value is received, and the second time associated with a time when an uplink signal is transmitted; and transmit, to the mobile wireless communication network, an uplink signal using the second timing advance value.

* * * * *